US010141866B2

(12) United States Patent
Manjrekar

(10) Patent No.: US 10,141,866 B2
(45) Date of Patent: Nov. 27, 2018

(54) MULTI-LEVEL INVERTER WITH FIRST AND SECOND SWITCH BANKS

(71) Applicant: The University of North Carolina at Charlotte, Charlotte, NC (US)

(72) Inventor: Madhav Manjrekar, Charlotte, NC (US)

(73) Assignee: THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 0 days.

(21) Appl. No.: 15/510,916

(22) PCT Filed: Sep. 11, 2015

(86) PCT No.: PCT/US2015/049731
§ 371 (c)(1),
(2) Date: Mar. 13, 2017

(87) PCT Pub. No.: WO2016/040828
PCT Pub. Date: Mar. 17, 2016

(65) Prior Publication Data
US 2017/0250624 A1 Aug. 31, 2017

Related U.S. Application Data

(60) Provisional application No. 62/048,880, filed on Sep. 11, 2014.

(51) Int. Cl.
*H02M 7/483* (2007.01)
*H02M 7/537* (2006.01)
(Continued)

(52) U.S. Cl.
CPC .......... *H02M 7/537* (2013.01); *H02M 1/083* (2013.01); *H02M 1/14* (2013.01); *H02M 7/487* (2013.01);
(Continued)

(58) Field of Classification Search
CPC ........ H02M 7/49; H02M 7/487; H02M 7/483; G05F 1/445; G05F 1/595
See application file for complete search history.

(56) References Cited

U.S. PATENT DOCUMENTS

2005/0127853 A1* 6/2005 Su ................ H02M 7/487
318/108
2011/0286252 A1 11/2011 Cui
(Continued)

FOREIGN PATENT DOCUMENTS

WO WO 2006/027744 A2 3/2006
WO WO 2013080465 A1 * 6/2013 ............ H02M 7/487

OTHER PUBLICATIONS

Kim, Rae-Young; Lee Yo-Han; Hyun, Dong-Seok; A New Link Potential Control Scheme for Four-Level Inverter with Passive Rectifier; Applied Power Electronics Conference (APEC), IEEE, vol. 1, Jun. 1999, pp. 528-534.*
(Continued)

*Primary Examiner* — Harry Behm

(57) ABSTRACT

Various examples are directed to systems and methods for a multi-level inverter to convert direct current (DC) to alternating current (AC). The inverter may comprise first, second and third capacitors electrically coupled in series between a positive DC rail and a negative DC rail. A first pole switch bank of the inverter may comprise a plurality of first pole switches. A first pole may be electrically coupled to the first pole switch bank. A control circuit may comprise at least one processor that is programmed to alternately switch the first pole switch bank to a first state of the first pole switch bank in which the first pole is electrically coupled to the positive DC rail, a second state of the first pole switch bank in which the first pole is electrically coupled between the first capacitor and the second capacitor, a third state of the first pole switch bank in which the first pole is electrically coupled
(Continued)

between the second capacitor and the third capacitor, a fourth state of the first pole switch bank in which the first pole is electrically coupled to the negative DC rail.

8 Claims, 15 Drawing Sheets

(51) Int. Cl.
*H02M 1/08* (2006.01)
*H02M 1/14* (2006.01)
H02M 1/00 (2006.01)
H02M 7/487 (2007.01)
H02M 7/49 (2007.01)

(52) U.S. Cl.
CPC ...... *H02M 7/49* (2013.01); *H02M 2001/0048* (2013.01)

(56) References Cited

U.S. PATENT DOCUMENTS

| 2013/0014384 | A1 | 1/2013 | Xue et al. | |
|---|---|---|---|---|
| 2014/0307489 | A1* | 10/2014 | Kidera | H02M 7/487 363/40 |
| 2015/0280608 | A1* | 10/2015 | Yoscovich | H02M 7/483 363/131 |

OTHER PUBLICATIONS

International Search Report and Written Opinion for International Application No. PCT/US2015/049731, dated Dec. 11, 2015.

\* cited by examiner

MULTI-LEVEL INVERTER WITH FIRST AND SECOND SWITCH BANKS

PRIORITY

This application claims the benefit of U.S. Provisional Application Ser. No. 62/048,880 filed on Sep. 11, 2014, which is incorporated herein by reference in its entirety.

BACKGROUND

Many electric devices, such as motor, refrigerators, cars, fans, etc. are configured to utilize alternating current (AC). Although the power grid provides AC, many other power supplies generate direct current (DC), including photovoltaic cells, fuel cells, batteries, etc. To Inverters are used to power AC devices with DC. Inverters receive DC and convert it to AC that can be used, for example, to power an AC device. Conventional inverters, however, can be large and can generate significant heat.

DETAILED DESCRIPTION

Figure 1:
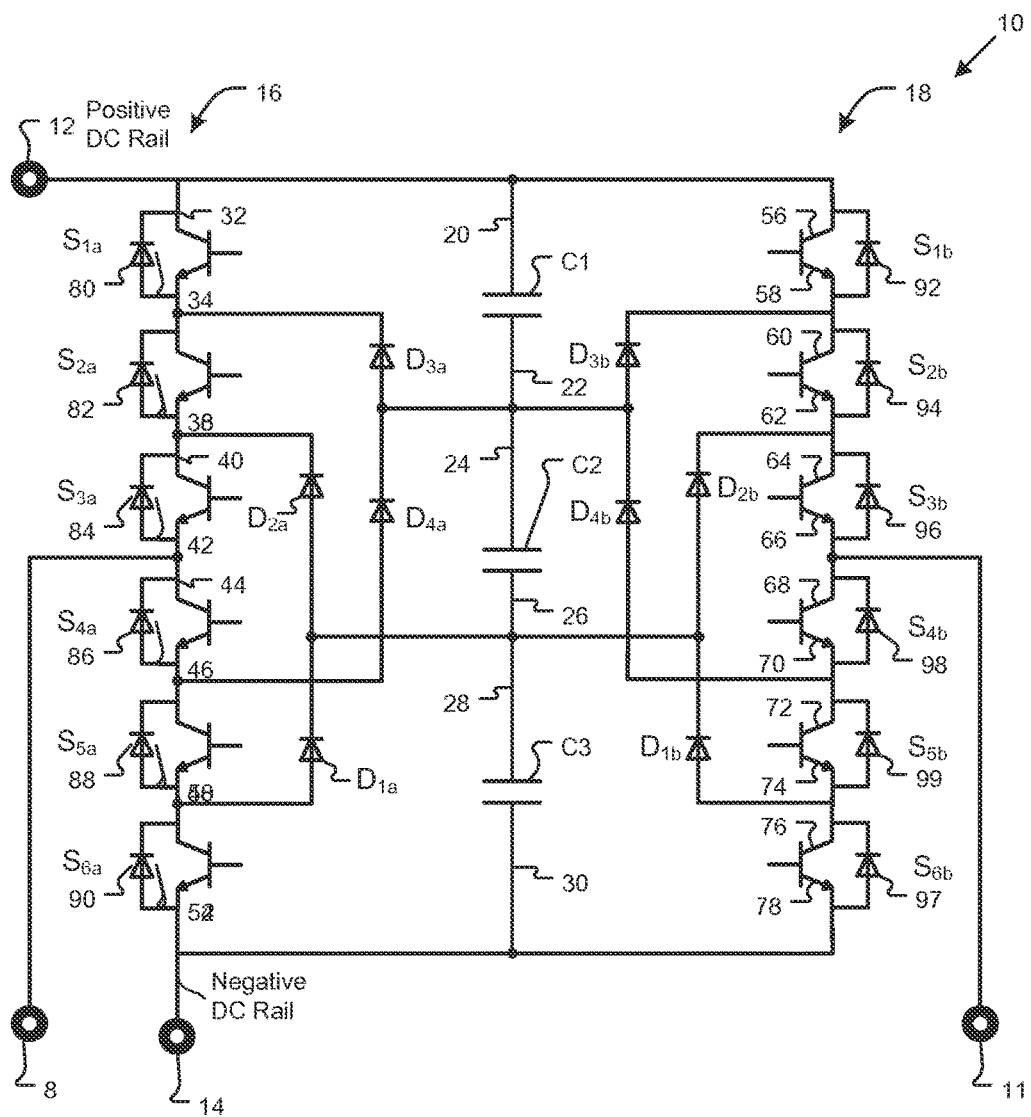
FIG. 1 is a diagram showing one example of an inverter for converting direct current (DC) to alternating current (AC).

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples are directed to a direct current (DC) to alternating current (AC) inverter comprising three capacitors, a first pole switch bank and a second pole switch bank. A DC input voltage may be provided to the inverter on a DC bus comprising a positive DC rail and a negative DC rail. The output of the inverter may be provided between a first pole and a second pole, with the first pole electrically coupled to the first switch bank and the second pole electrically coupled to the second switch bank. The capacitors may be connected in series between the positive DC rail and the negative DC rail. Accordingly, each of the three capacitors may drop one-third (⅓) of the DC input voltage. For example, when the DC input voltage is a 450 Volt DC signal, each capacitor may drop 150 Volts. In some examples, the inverter may be configured to provide 2 kVA of power.

A control circuit may configure the first pole switch bank and the second pole switch bank to alternately connect the first and second poles to the series capacitors at different positions. For example, the control circuit may configure the first pole switch bank to one of four states. In a first state, the first pole may be electrically coupled to the positive DC rail, which may be at the DC input voltage. In a second state, the first pole may be electrically coupled between two of the capacitors and the negative DC rail, drawing the first pole to a voltage of about two-thirds (⅔) of the DC input voltage. In a third state, the first pole may be electrically coupled between one of the capacitors and the negative DC rail, drawing the first pole to a voltage of about one-third (⅓) of the DC input voltage. In a fourth state, the first pole may be electrically coupled to the negative DC rail, drawing the voltage of the first pole to zero.

The control circuit may similarly configure the second pole bank between one of four states to draw the second pole to the DC input voltage; ⅔ of the DC input voltage; ⅓ of the DC input voltage; and zero. The output of the inverter may be the difference between the voltage at the first pole and the voltage at the second pole. Accordingly, the inverter may have seven possible output levels: DC input voltage; ⅔ DC input voltage; ⅓ DC input voltage; zero; −⅓ DC input voltage; −⅔ DC input voltage and −DC input voltage. The control circuit may be programmed, as described herein, to cycle the first pole switch bank and the second pole switch bank according to a sequence that creates a suitable waveform (e.g., a Pulse Width Modulated (PWM) waveform) between the poles, for example, as described herein. A low-pass filter may be applied to the output of the inverter to generate an AC signal.

FIG. 1 is a diagram showing one example of an inverter 10 for converting DC to AC. The inverter 10 may receive the DC input voltage at a DC bus comprising a positive DC rail 12 and a negative DC rail 14. For example, a voltage difference between the positive DC rail 12 and the negative DC rail 14 may be equal to the DC input voltage. The DC input voltage may be any suitable value. In some examples, the DC input voltage may be 450 Volts. In some examples, the DC input voltage may be 500 Volts. An output of the inverter 10 may be taken between a first pole 8 and a second pole 11. For example, the output of the inverter 10 may be a voltage difference between the first pole 8 and the second pole 11.

Three capacitors C1, C2, and C3 may be electrically coupled in series between the positive DC rail 12 and the negative DC rail 14. The capacitors C1, C2, C3 may be of any suitable type and have any suitable capacitance. In some examples configured to generate a 240 V rms output signal, the capacitors C1, C2, C3 may be selected with a capacitance of 1000 μF. A first terminal 20 of the capacitor C1 may be electrically coupled to the positive DC rail 12. A second terminal 22 of the capacitor C1 may be electrically coupled to a first terminal 24 of the capacitor C2. A second terminal 26 of the capacitor C2 may be electrically coupled to a first terminal 28 of the capacitor C3. A second terminal 30 of the capacitor C3 may be electrically coupled to the negative DC rail 14. In some examples, each capacitor may drop ⅓ of the DC input voltage. Accordingly, relative to the negative DC rail 14, the first terminal 20 of the capacitor C1 may be at the DC input voltage. The first terminal 24 of the capacitor C2 may be at ⅔ of the DC input voltage. The first terminal 28 of the capacitor C3 may be at ⅓ of the DC input voltage. Also, the second terminal 30 of the capacitor C3 may be at zero volts relative to the negative DC rail.

A first pole switch bank 16 may comprise switches S1a, S2a, S3a, S4a, S5a, S6a that may be configured by the control circuit (FIG. 2) to alternately connect the first pole 8 to the capacitors C1, C2, C3 and/or DC rails 12, 14 to alternately draw the first pole 8 to the DC input voltage, ⅔ of the DC input voltage, ⅓ of the DC input voltage and zero, as described herein. First Pole 8 may be coupled to the emitter 42 of the switch S3a. In FIG. 1, the switches S1a, S2a, S3a, S4a, S5a, S6a are shown as NPN-type bipolar junction transistors, although any other suitable type of transistor or other switch may be used. In some examples, each switch S1a, S2a, S3a, S4a, S5a, S6a may comprise an Insulated Gate Bipolar Transistor (IGBT). In some examples, each switch S1a, S2a, S3a, S4a, S5a, S6a may comprise an IGBT rated for 300 Volts and 20 Amps, for example, in a TO-247 or TO-220 package. Also, in some examples, the switches S1a, S2a, S3a, S4a, S5a, S6a may include transistors of other types such as, for example, Silicon Carbon (SiC) transistors, Gallium Nitride (GaN) transistors, etc. In various examples, switches of other architectures may also be used, such as field effect transistors (FETs), etc. In examples where different types of switches are used, different terminology may also be used. For example, the terminals of a FET may be referred to as the source, the drain and the gate as opposed to the collector, the emitter and the base.

Figure 2:
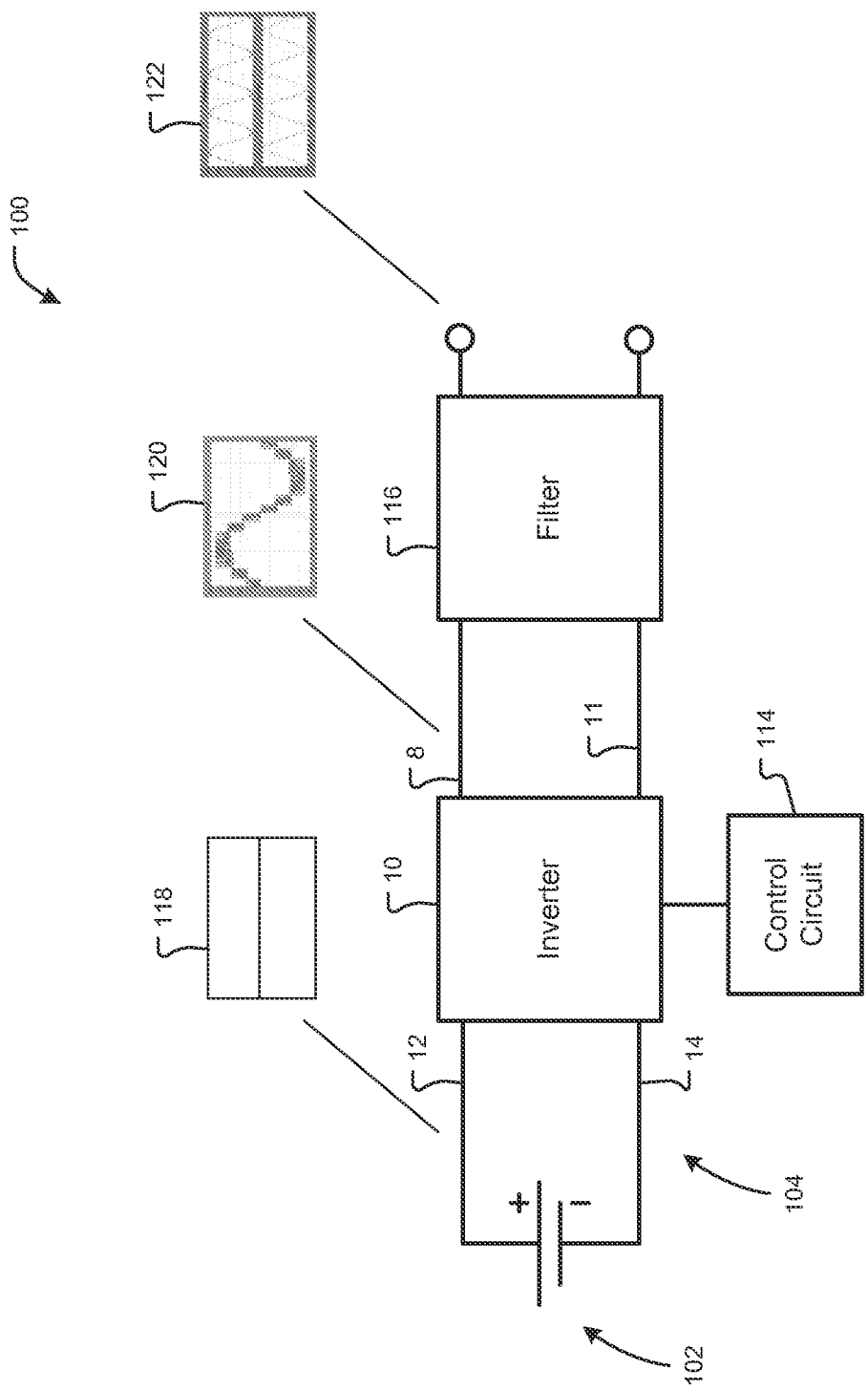
FIG. 2 is a diagram showing one example of an inverter system for converting DC to AC.

In the example of FIG. 1, the switches S1a, S2a, S3a, S4a, S5a, S6a are electrically coupled in series between the positive DC rail 12 and the negative DC rail 14. For example, a collector 32 of the switch S1a is electrically coupled to the positive DC rail 12. An emitter 34 of the switch S1a is electrically coupled to a collector 36 of the switch S2a. An emitter 38 of the switch S2a is electrically coupled to a collector 40 of the switch S3a. An emitter 42 of the switch S3a is electrically coupled to a collector 44 of the switch S4a. An emitter 46 of the switch S4a is electrically coupled to a collector 48 of the switch S5a. An emitter 50 of the switch S5a is electrically coupled to a collector 52 of the switch S6a. An emitter 54 of the switch S6a is electrically coupled to the negative DC rail 14. The switches S1a, S2a, S3a, S4a, S5a, S6a are shown in the example of FIG. 1 to be NPN bipolar junction transistors. In examples where other types of switches are used, however, (e.g., PNP bipolar junction transistors, Field Effect Transistors (FETs), etc.) different circuit topologies may be utilized to generate the states of the first pole 8 described herein. Also, each of the switches S1a, S2a, S3a, S4a, S5a, S6a may comprise a base that may be electrically coupled to the control circuit (FIG. 2). In some examples, the control circuit may draw the base of a switch S1a, S2a, S3a, S4a, S5a, S6a high to close the switch and low to open the switch. In some examples, each switch S1a, S2a, S3a, S4a, S5a, S6a may comprise a bypass diode 80, 82, 84, 86, 88, 90 connected opposite the polarity of the switch S1a, S2a, S3a, S4a, S5a, S6a. For example, when the switch S1a is closed, it may conduct current from its collector 32 to its emitter 34. Bypass diode 80 may be connected between the collector 32 and emitter 34 to permit current to flow in the opposite direction. This may facilitate the provision of different voltages at the first pole 8 as described herein.

The first pole switch bank 16 may also comprise clamping diodes D1a, D2a, D3a, D4a. The clamping diodes D1a, D2a, D3a, D4a may be connected to limit the voltage drop across each of the individual switches S1a, S2a, S3a, S4a, S5a, S6a. For example, the clamping diodes D1a, D2a, D3a, D4a may be connected, as shown and described herein, to ensure that no single switch S1a, S2a, S3a, S4a, S5a, S6a drops more than ⅓ of the DC input voltage. In this way, the switches S1a, S2a, S3a, S4a, S5a, S6a may utilize components with voltage ratings based on a fraction of the DC input voltage (e.g., ⅓) instead of the entire DC input voltage. One example safety rating for inverter switches is 100%. Accordingly, a switch that could drop a an example DC input voltage of 450 Volts may be selected with a voltage rating of two times 450 Volts, or 900 Volts. In the example of FIG. 1, however, the maximum voltage drop across any individual switch S1a, S2a, S3a, S4a, S5a, S6a may be ⅓ of 450 Volts, or 150 Volts. Accordingly, with a 100% safety margin, the switches S1a, S2a, S3a, S4a, S5a, S6a may be selected to support a maximum voltage drop of 300 Volts. Because switches with lower voltage ratings are often smaller, this may reduce the size of the inverter 10.

TABLE 1 below shows example configurations of the switches S1a, S2a, S3a, S4a, S5a, S6a to bring about four states of the first pole switch bank 16:

TABLE 1

| State | Switches Closed | Voltage at Pole 8 |
| --- | --- | --- |
| First | S1a, S2a, S3a | DC input voltage |
| Second | S2a, S3a, S4a | ⅔ DC input voltage |
| Third | S3a, S4a, S5a | ⅓ DC input voltage |
| Fourth | S4a, S5a, S6a | Zero (negative DC rail) |

In the first state, switches S1a, S2a and S3 may be closed allowing current to flow from the respective collectors 32, 36, 40 to the respective emitters 34, 38, 42. Switches S4a, S5a and S6a may be open, preventing current from flowing through those switches. In this configuration, first pole 8 may be coupled to the positive DC rail 12 via the closed switches S1a, S2a, S3a. Accordingly, the voltage at the first pole 8 relative to the negative DC rail may be equal to the DC input voltage. In the first state, first pole 8 may source current from the capacitors C1, C2 and C3, which may flow through switches S1a, S2a, S3a to first pole 8. The first pole 8 may also sink current to the capacitor C1 via diodes 80, 82, 84, or draw no current. Whether the first pole 8 sources current, sinks current, or draws no current may depend on the load and state of the second switch bank and pole 11.

In the second state, switches S2a, S3a, S4a may be closed while switches S1a, S5a and S6a may be open. In this state, first pole 8 may be coupled between the capacitor C1 and the capacitor C2 (e.g., at terminal 22 of capacitor C1 and/or terminal 24 of capacitor C2). Accordingly, the voltage at the first pole 8 relative to the negative DC rail may be equal to about ⅔ of the DC input voltage. In the second state, first pole 8 may source current from the capacitors C2 and C3 via switches S2a and S3a, may sink current to capacitor C2 via switch S4a, or draw no current, again depending on the load and the state of the second switch bank and second pole 11.

In the third state, switches S3a, S4a, S5a may be closed while switches S1a, S2a and S6a are open. In the third state, first pole 8 may be coupled between the capacitor C2 and the capacitor C3 (e.g., at terminal 26 of the capacitor C2 and/or terminal 28 of the capacitor C3). Accordingly, the voltage at first pole 8 may be equal to about ⅓ of the DC input voltage. In the third state, first pole 8 may source current from the capacitor C3 via the switch S3a, may sink current to the capacitor C3 via the switches S4a and S5a, or may draw no current, again depending on the load and the state of the second switch bank and second pole 11.

In the fourth state, switches S4a, S5a, S5a may be closed while switches S1a, S2a and S3a are open. In the fourth state, first pole 8 may be coupled to the negative DC rail 14. Accordingly, the voltage at first pole 8 may be about zero relative to the positive DC rail 12. In the fourth state, first pole 8 may source current via the diodes 86, 88, 90, may sink current to the negative DC rail 14 via switches S4a, S4a, S6a, or may draw no current, again depending on the load and the state of the second switch bank and second pole 11.

In various examples, the second pole switch bank 18 may be configured similar to the first pole switch bank 16. For example, the switches S1b, S2b, S3b, S4b, S5b, S6b may be or comprise components similar to those described above with respect to the switches S1a, S2a, S3a, S4a, S5a, S6a. The switches S1b, S2b, S3b, S4b, S5b, S6b may also be configured similar to the switches of the first pole switch bank 16 to alternately connect the second pole 11 to the capacitors C1, C2, C3 and/or DC rails 12, 14 to alternately draw the second pole 11 to the DC input voltage, ⅔ of the DC input voltage, ⅓ of the DC input voltage and zero, as described herein. Second Pole 11 may be coupled to the emitter 66 of the switch S3b. The switches S1b, S2b, S3b, S4b, S5b, S6b, in the example shown in FIG. 1, are electrically coupled in series between the positive DC rail 12 and the negative DC rail 14. For example, a collector 56 of the switch S1b is electrically coupled to the positive DC rail 12. An emitter 58 of the switch S1b is electrically coupled to a collector 60 of the switch S2a. An emitter 62 of the switch S2b is electrically coupled to a collector 64 of the switch S3a. An emitter 66 of the switch S3b is electrically coupled to a collector 68 of the switch S4a. An emitter 70 of the switch S4b is electrically coupled to a collector 72 of the switch S5a. An emitter 74 of the switch S5b is electrically coupled to a collector 76 of the switch S6a. An emitter 78 of the switch S6b is electrically coupled to the negative DC rail 14. As described, the switches S1b, S2b, S3b, S4b, S5b, S6b are shown in the example of FIG. 1 to be NPN bipolar junction transistors. In examples where other types of switches are used (e.g., PNP bipolar junction transistors, FETs, etc.) different circuit topologies may be utilized to generate the states of the first pole 8 described herein. Also, each of the switches S1b, S2b, S3b, S4b, S5b, S6b may comprise a base that may be electrically coupled to the control circuit (FIG. 2). In some examples, the control circuit may draw the base of a switch S1b, S2b, S3b, S4b, S5b, S6b high to close the switch and low to open the switch. In some examples, each switch S1b, S2b, S3b, S4b, S5b, S6b may comprise a bypass diode 92, 94, 96, 98, 99, 97 connected opposite the polarity of the switch S1b, S2b, S3b, S4b, S5b, S6a. For example, when the switch S1b is closed, it may conduct current from its collector 92 to its emitter 34. Bypass diode 92 may be connected between the collector 32 and emitter 34 to permit current to flow in the opposite direction. This may facilitate the provision of different voltages at the first pole 8 as described herein.

The second pole switch bank 18 may also comprise clamping diodes D1b, D2b, D3b, D4b. The clamping diodes D1b, D2b, D3b, D4b may be connected, similar to the clamping diodes D1a, D2a, D3a, D4a to limit the voltage drop across each of the individual switches S1b, S2b, S3b, S4b, S5b, S6a. For example, the clamping diodes D1b, D2b, D3b, D4b may be connected, as shown and described herein, to ensure that no single switch S1b, S2b, S3b, S4b, S5b, S6b drops more than ⅓ of the DC input voltage allowing the use of switches S1b, S2b, S3b, S4b, S5b, S6b with lower voltage ratings. As with the first pole switch bank 16, the control circuit (FIG. 2) may be programmed to configure the second pole switch bank 18 to four states, as indicated by TABLE 2:

TABLE 2

| State | Switches Closed | Voltage at First Pole 8 |
|---|---|---|
| First | S1b, S2b, S3b | DC input voltage |
| Second | S2b, S3b, S4b | ⅔ DC input voltage |
| Third | S3b, S4b, S5b | ⅓ DC input voltage |
| Fourth | S4b, S5b, S6b | Zero (negative DC rail) |

The control circuit (FIG. 2) may be programmed to cycle the first pole switch bank 16 and the second pole switch bank 18 between states according to one or more switching sequences to generate different output voltage levels for the inverter 10 (e.g. across the first and second poles 8, 11). Example switching sequences are described herein with respect to FIGS. 3-10. In some examples, the inverter 10 may be configured to assume seven different output voltages: (1) the DC input voltage; (2) ⅔ of the DC input voltage; (3) ⅓ of the DC input voltage; (4) zero; (5) −⅓ of the DC input voltage; (6) −⅔ of the DC input voltage; and (7) −1 of the DC input voltage. In some examples, the control circuit may cycle the switch banks 16, 18 between states to generate a waveform as the output of the inverter 10, for example, as described herein.

TABLE 3 below shows states of the pole switch banks 16, 18 that configure the inverter 10 to provide different output voltages:

TABLE 3

| Output Level | First Pole Switch Bank State(s) | Second Pole Switch Bank State(s) |
|---|---|---|
| DC input voltage | (1) First (First Pole 8 = DC input voltage) | (1) Fourth (Second Pole 11 = Zero) |
| ⅔ DC input voltage | (1) First (First Pole 8 = DC input voltage) | (1) Third (Second Pole 11 = ⅓ DC input voltage) |
| | (2) Second (First Pole 8 = ⅔ DC input voltage) | (2) Fourth (Second Pole 11 = zero) |
| ⅓ DC input voltage | (1) First (First Pole 8 = DC input voltage) | (1) Second (Second Pole 11 = ⅔ DC input voltage) |

TABLE 3-continued

| Output Level | First Pole Switch Bank State(s) | Second Pole Switch Bank State(s) |
|---|---|---|
| | (2) Second (First Pole 8 = ⅔ DC input voltage) | (2) Third (Second Pole 11 = ⅓ DC input voltage) |
| | (3) Third (First Pole 8 = ⅓ DC input voltage) | (3) Fourth (Second Pole 11 = zero) |
| 0 (negative rail of DC input voltage) | (1) First (First Pole 8 = DC input voltage) | (1) First (Second Pole 11 = DC input voltage) |
| | (2) Second (First Pole 8 = ⅔ DC input voltage) | (2) Second (Second Pole 11 = ⅔ DC input voltage) |
| | (3) Third (First Pole 8 = ⅓ DC input voltage) | (3) Third (Second Pole 11 = ⅓ DC input voltage) |
| | (4) Fourth (First Pole 8 = zero) | (4) Fourth (Second Pole 11 = zero) |
| −⅓ DC input voltage | (1) Second (First Pole 8 = ⅔ DC input voltage) | (1) First (Second Pole 11 = DC input voltage) |
| | (2) Third (First Pole 8 = ⅓ DC input voltage) | (2) Second (Second Pole 11 = ⅔ DC input voltage) |
| | (3) Fourth (First Pole 8 = zero) | (3) Third (Second Pole 11 = ⅓ DC input voltage) |
| −⅔ DC input voltage | (1) Third (First Pole 8 = ⅓ DC input voltage) | (1) First (Second Pole 11 = DC input voltage) |
| | (2) Fourth (First Pole 8 = zero) | (2) Second (Second Pole 11 = ⅔ DC input voltage) |
| −DC input voltage | (1) Fourth (First Pole 8 = zero) | (1) First (Second Pole 11 = DC input voltage) |

In various examples, the inverter 10 may provide the DC input voltage across the poles 8, 11 when the first pole switch bank 16 is in the first state (see TABLE 1) and the second pole switch bank is in the fourth state (see TABLE 2). For example, when the first pole switch bank 16 is in the first state, it may draw the first pole 8 to the DC input voltage. When the second pole switch bank 18 is in the fourth state, it may draw the second pole 11 to zero (e.g., the negative DC rail voltage). Accordingly, the voltage between the poles 8, 11 may be about equal to the DC input voltage.

In various examples, the inverter 10 may provide ⅔ of the DC input voltage across the poles 8, 11 in two different configurations of the switch banks 16, 18. For example, the inverter 10 may provide ⅔ of the DC input voltage across the poles 8, 11 when the first pole switch bank 16 is in the first state and the second pole switch bank 18 is in the third state. In the first state, the first pole switch bank 16 may draw the first pole 8 to the DC input voltage. In the third state, the second pole switch bank may draw the second poll 11 to ⅓ of the DC input voltage. Accordingly, the voltage between the poles 8, 11 may be about equal to the difference, e.g., ⅔ of the DC input voltage. In some examples, the inverter 10 may also provide ⅔ of the DC input voltage across the poles 8, 11 when the first pole switch bank 16 is in the second state and the second pole switch bank 18 is in the fourth state. In the second state, the first pole switch bank 16 may draw the first pole 8 to about ⅔ of the DC input voltage. In the fourth state, the second pole switch bank may draw the second pole 11 to zero. Accordingly, the voltage between the poles 8, 11 may be equal to the difference, e.g., ⅔ of the DC input voltage.

In various examples, there may be three combinations of switch bank states that cause the inverter 10 to provide about ⅓ of the DC input voltage across the poles 8, 11. For example, when the first pole switch bank 16 is in the first state and the second pole switch bank 18 is in the third state, the first pole 8 and second pole 11 may be drawn to the DC input voltage and ⅔ of the DC input voltage, respectively. The difference between the voltage at the poles 8, 11, then, may be ⅓ of the DC input voltage. Similarly, ⅓ of the DC input voltage may appear across the poles 8, 11 when the first pole switch bank 16 is in the second state (e.g., ⅔ DC input voltage at pole 8) and the second pole switch bank 18 is in the third state (e.g., ⅓ DC input voltage at pole 11). Also, ⅓ of the DC input voltage may appear across the poles 8, 11 when the first pole switch bank 16 is in the third state (e.g., ⅓ of the DC input voltage at pole 8) and the second pole switch bank 18 is in the fourth state (e.g., zero at pole 11).

In various examples, the output of the inverter 10 at the poles 8, 11 may be equal to zero when the pole switch banks 16, 18 are in the same state and, therefore, the poles 8, 11 at the same voltage. For example, the poles 8, 11 may be at the same voltage in four state combinations: when both banks 16, flare in the first state; when both banks 16, 18 are in the second state; when both banks 16, 18 are in the third state; and when both banks 16, 18 are in the fourth state.

In various examples, there may also be three combinations of switch bank states that cause the inverter 10 to provide about −⅓ of the DC input voltage across the poles 8, 11. For example, when the first pole switch bank 16 is in the second state (e.g., ⅔ DC input at the pole 8) and the second pole switch bank 18 is in the first state (e.g., ⅓ DC input at the pole 11), then the voltage difference across the poles 8, 11 may be −⅓ of the DC input voltage. The voltage difference across the poles 8, 11 may also be −⅓ of the DC input voltage when the first pole switch bank 16 is in the third state (e.g., ⅓ DC input voltage at the pole 8) and the second pole switch bank 18 is in the second state (e.g., ⅔ DC input voltage at the pole 11). Similarly, the voltage difference across the poles 8, 11 may also be ⅓ of the DC input voltage when the first pole switch bank 16 is in the fourth state (e.g., zero at the pole 8) and the second pole switch bank is in the third state (e.g., ⅓ DC input voltage at the pole 11).

In various examples, there may be two combinations of switch bank states that cause the inverter to provide about −⅔ of the DC input voltage across the poles 8, 11. For example, the output of the inverter may be about −⅔ of the DC input voltage when the first pole switch bank 16 is in the third state (e.g., ⅓ DC input voltage at the pole 8) and the second pole switch bank 18 is at the first state (e.g., DC input voltage at the pole 11). Also, for example, the output of the inverter may be about −⅔ of the DC input voltage when the first pole switch bank 16 is in the fourth state (e.g., zero at the pole 8) and the second pole switch bank 18 is in the second state (e.g., ⅔ DC input voltage at the pole 11). Additionally, there may be a single combination of switch bank states that draw the output of the inverter 10 to the negative of the DC input voltage such as, for example, when the first pole switch bank 16 is in the fourth state (e.g., zero at the pole 8) and the second pole switch bank 18 is at the first state (e.g., DC input voltage at the pole 11).

FIG. 2 is a diagram showing one example of an inverter system 100 comprising the example inverter 10. In addition to the inverter 10, the inverter system 100 comprises a DC source 102, a control circuit 114 and a filter 116. The DC source may be any suitable DC source including, for example, a battery, a solar cell or set of solar cells, a fuel cell or set of fuel cells, etc. The DC source 102 may provide a DC input having the DC input voltage described herein. An example DC input 118 is shown. In some examples, the DC source 102 may provide a DC input voltage of 450 Volts. The DC input may be provided to the inverter 101 via a DC bus 104 comprising the positive DC rail 12 and a negative DC rail 14. A control circuit 114 may configure the various switches of the inverter 10 to set its output voltage. In some examples, the control circuit 114 may configure the switches according to a sequence to generate a waveform 120 between the poles 8, 11. The control circuit 114 may comprise any suitable hardware for configuring the switches of the inverter 10. In some examples, the control circuit 114 may comprise one or more microprocessors, microcontrollers or other suitable processors along with associated memory. In addition to or instead of a processor, the control circuit 114 may comprise other control hardware such as, for example, a hardwired state machine implemented utilizing logic gates. A state machine may be implemented, for example, utilizing an application specific integrated circuit (ASIC) or other suitable hardware. In some examples, the control circuit 114 may comprise an output stage (not shown) for translating a digital output of a microprocessor to an analog current that may be provided to the bases of the switches of the inverter 10 to close the switches.

The waveform 120 may be provided to a low-pass filter 116, which may provide an output AC signal 122. The low-pass filter 116 may comprise various circuit components including, for example, capacitors, inductors, etc. The low-pass filter 116 may remove high frequency components of the waveform 120 including, for example, the switching frequency and its related harmonics. As described herein, the switching frequency, in some examples, may be about 10 kHz. Some examples of the low-pass filter 116 may be and/or comprise an LC circuit. In one example where the DC input voltage is 450 Volts and the output is a 240 Volt RMS sine wave, the inductor may have an inductance of about 75 µH and the capacitor may have a capacitance of 80 µF. In this example, the AC signal 122 may be sinusoidal with a total harmonic distortion (THD) of <5%. Also, in some examples, the low-pass filter 116 may be implemented digitally utilizing a digital signal processor (DSP) or other suitable processor.

In various examples, the AC signal 122 may be configured to meet standards for an electric grid network, either to provide the output of the system 100 to an electric grid or to power devices configured to operate on the electric grid. For example, the AC signal 122 may be a 60 Hz sine wave with a 120 Volts RMS. In other examples, the AC signal may be a 60 Hz sine wave at 240 Volts RMS. In various examples, because the inverter 10 has seven available levels, the control circuit 114 may modulate the various switches to create a waveform 120 with fewer DC or lower frequency content. As a result, the capacitance and/or inductance of active components of the filter 116 may be reduced, further reducing the size of the system 100.

Figure 3:
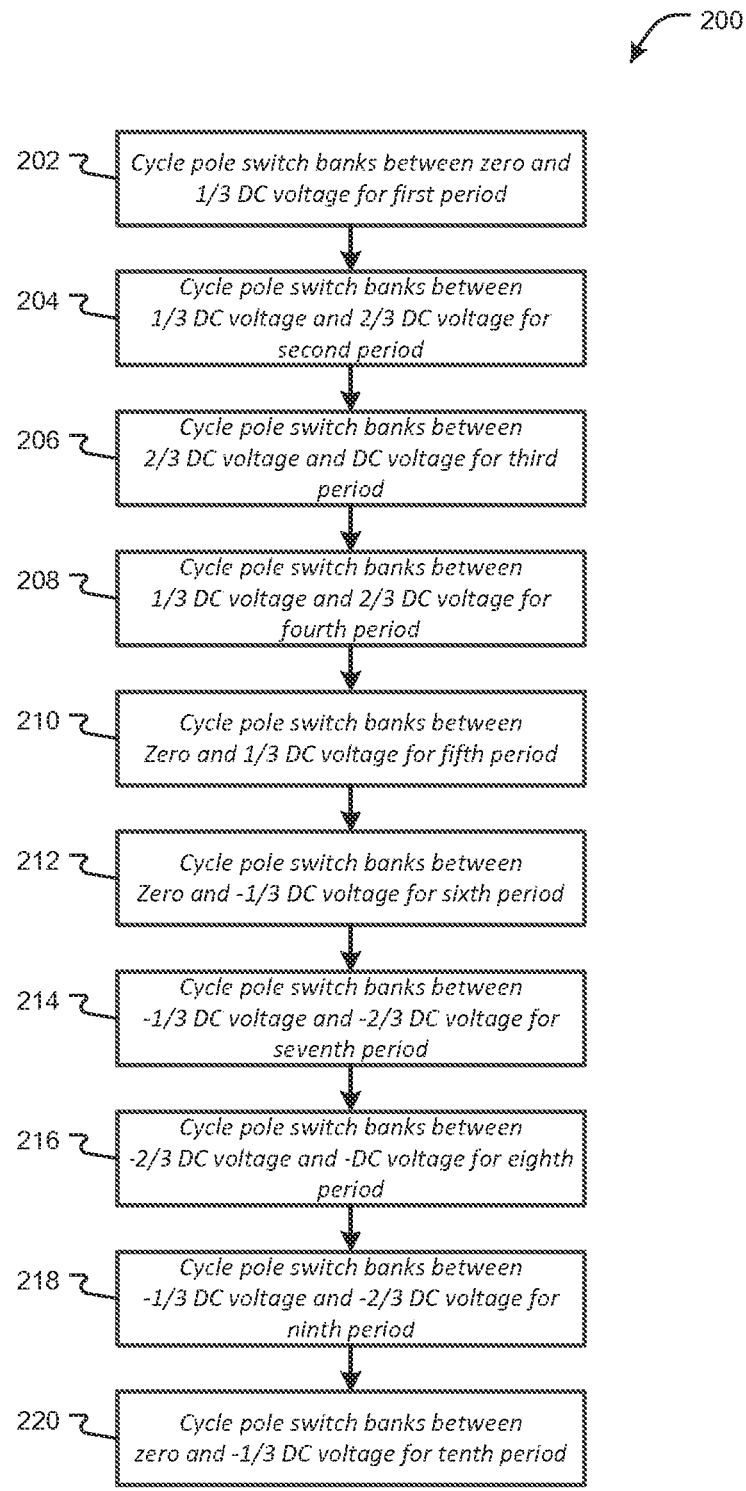
FIG. 3 is a flowchart showing one example of a process flow that may be executed by the control circuit to generate a waveform utilizing the inverter of FIGS. 1 and 2.

The control circuit 114 may modulate the various switches according to one or more sequences to generate the waveform 120. FIG. 3 is a flowchart showing one example of a process flow 200 that may be executed by the control circuit 114 to generate a waveform 120. At 202, the control circuit 114 may cycle the pole switch banks 16, 18 sequentially back-and-forth between a sequence of states that draw the output of the inverter 10 alternately to zero and ⅓ of the DC input voltage. For example, TABLE 4 below illustrates a sequence of switch bank states that cycle the switch banks 16, 18 to draw the output of the inverter 10 between zero and ⅓ of the DC input voltage:

TABLE 4

|   | First Bank 16 State (Switches Closed) | Second Bank 18 State (Switches Closed) | Output Voltage (First Pole 8 - Second Pole 11) |
|---|---|---|---|
| 1 | First (S1a, S2a, S3a) | First (S1b, S2b, S3b) | 0 Volts (DC input voltage - DC input voltage) |
| 2 | First (S1a, S2a, S3a) | Second (S2b, S3b, S4b) | ⅓ DC input voltage (DC input voltage - ⅔ DC input voltage) |
| 3 | Second (S2a, S3a, S4a) | Second (S2b, S3b, S4b) | 0 Volts (⅔ DC input voltage - ⅔ DC input voltage) |
| 4 | Second (S2a, S3a, S4a) | Third (S3b, S4b, S5b) | ⅓ DC input voltage (⅔ DC input voltage - ⅓ DC input voltage) |
| 5 | Third (S3a, S4a, S5a) | Third (S3b, S4b, S5b) | 0 Volts (⅓ DC input voltage - ⅓ DC input voltage) |
| 6 | Third (S3a, S4a, S5a) | Fourth (S4b, S5b, S6b) | ⅓ DC input voltage (⅓ DC input voltage - zero) |
| 7 | Fourth (S4a, S5a, S6a) | Fourth (S4b, S5b, S6b) | 0 Volts (zero-zero) |

The control circuit 114 may configure the pole switch banks 16, 18 to traverse the sequence of states shown in TABLE 4 sequentially back-and-forth. For example, the control circuit 114 may proceed from the states of Row 1 (First, First) to the states of Row 2 (First, Second), to the states of Row 3 (Second, Second), to the states of Row 4 (Second, Third), to the states of Row 5 (Third, Third), to the states of Row 6 (Third, Fourth), to the states of Row 7 (Fourth, Fourth) and back again. For example, when the control circuit 114 has configured the pole switch banks 16, 18 to the states of Row 7 (Fourth, Fourth), it may next proceed to the states of Row 6 (Third, Fourth), to the states of Row 5 (Third, Third) and so on. When the control circuit 114 again configures the pole switch banks 16, 18 in the states of Row 1 (First, First) it may proceed again to the set of state sin Row 2 and so on. In some examples, each of the transitions shown in TABLE 4 and executed at 202 may involve a change in state of just two of the 12 switches of the inverter 10. For example, between the states of Row 1 and the states of Row 1, switch S1b is opened and switch S4b is closed. Similarly, between the states of Row 2 and the states of Row 3 switch S1a is opened and switch S3a is closed. This configuration may minimize switching losses in the inverter 10, which may increase its efficiency.

Figure 4:
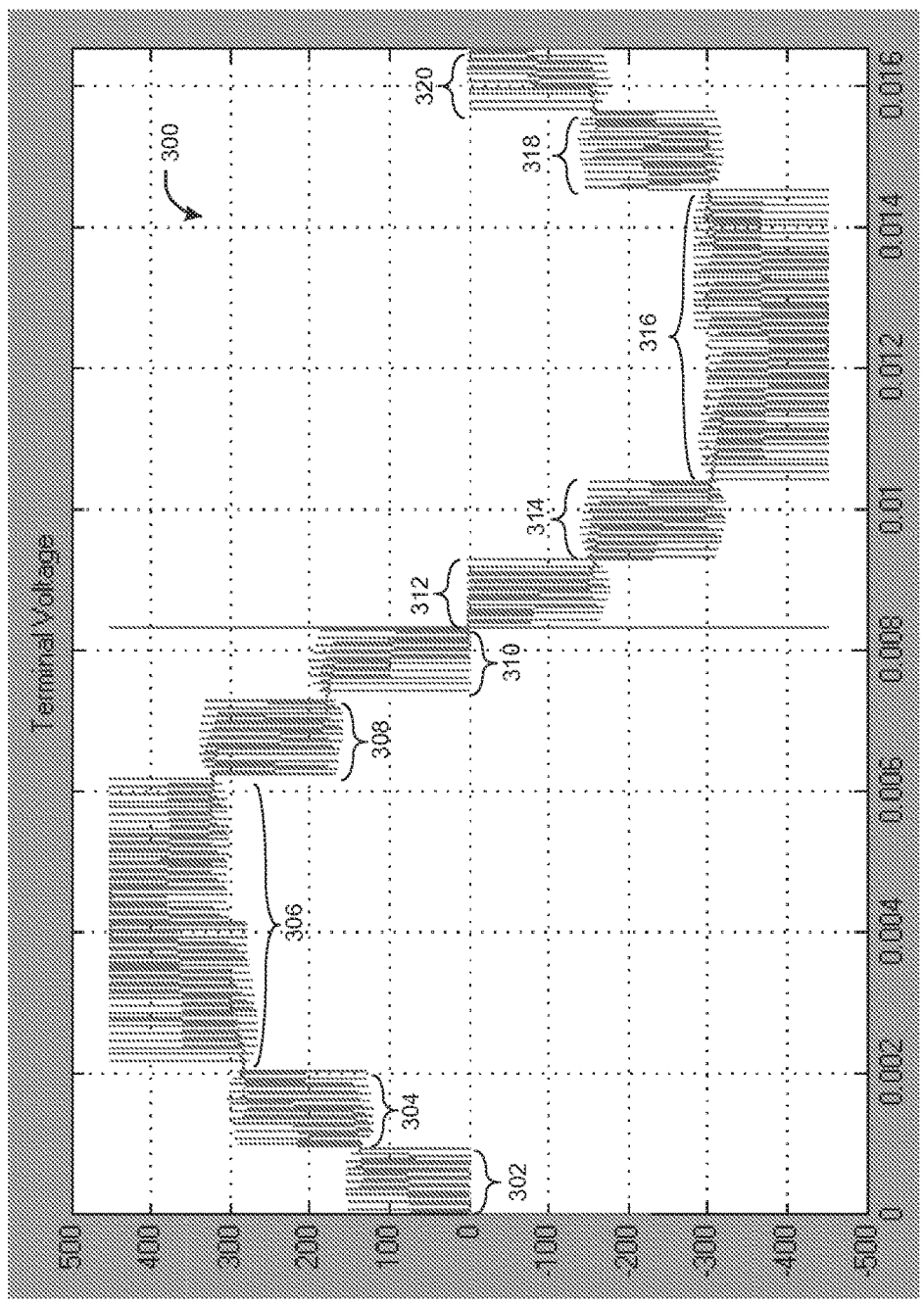
FIG. 4 is a diagram showing one example of a waveform that may be generated according to the process flow of FIG. 3.

The control circuit 114 may continue to cycle sequentially back-and-forth between states providing zero and ⅓ of the DC input voltage at the output of the inverter for a first period. The first period may be of any suitable length and may, for example, be some fraction of the total period of the desired AC output 122. The length of the first period may also be selected to affect the shape of the AC output 122. For example, when the output frequency is 60 Hz and the output wave shape is a sine wave, the first period may be about 1 ms. FIG. 4 is a diagram showing one example of a waveform 300 that may be generated according to the process flow 200. In the example shown in FIG. 4, the DC input voltage is 450 Volts. Accordingly, during the first period 302, the control circuit 114 cycles the output between zero and 150 Volts. Also, in the example of FIG. 4, the first period 302 extends from zero to 1 ms.

Referring back to FIG. 3, at 204, the control circuit 114 may cycle the pole switch banks 16, 18 sequentially back-and-forth between states that draw the output of the inverter alternately to ⅓ of the DC input voltage and ⅔ of the DC input voltage. For example, TABLE 5 below illustrates a sequence of switch bank states that cycle the switch banks 16, 18 to draw the output of the inverter 10 between ⅓ of the DC input voltage and ⅔ of the DC input voltage:

TABLE 5

| | First Bank 16 State (Switches Closed) | Second Bank 18 State (Switches Closed) | Output Voltage (First Pole 8 - Second Pole 11) |
|---|---|---|---|
| 1 | First (S1a, S2a, S3a) | Second (S2b, S3b, S4b) | ⅓ DC input voltage (DC input voltage - ⅔ DC input voltage) |
| 2 | First (S1a, S2a, S3a) | Third (S3b, S4b, S5b) | ⅔ DC input voltage (DC input voltage - ⅓ DC input voltage) |
| 3 | Second (S2a, S3a, S4a) | Third (S3b, S4b, S5b) | ⅓ DC input voltage (⅔ DC input voltage - ⅓ DC input voltage) |
| 4 | Second (S2a, S3a, S4a) | Fourth (S4b, S5b, S6b) | ⅔ DC input voltage (⅔ DC input voltage - zero) |
| 5 | Third (S3a, S4a, S5a) | Fourth (S4b, S5b, S6b) | ⅓ DC input voltage (⅓ DC input voltage - zero) |

The control circuit 114 may configure the pole switch banks 16, 18 to traverse the states shown in TABLE 5 sequentially back-and-forth. For example, the control circuit 114 may proceed from the states of Row 1 (First, Second), to the states of Row 2 (First, Third), to the states of Row 3 (Second, Third), to the states of Row 4 (Second, Fourth), to the states of Row 5 (Third, Fourth) and then back to Row 4, Row 3, Row 2 and Row 1 again, as described above. The control circuit 114 may continue to cycle sequentially back-and-forth between the states shown in TABLE 5 for a second period. In some examples, the second period may be 1 ms. For example, referring to FIG. 4, in the example second period 304, the output of the inverter 10 cycles between 150 Volts (⅓ of the 450 Volt DC input voltage) and 300 Volts (⅔ of the 450 Volt DC input voltage). Similar to what was described at 202, the difference between each consecutive set of states in the sequence shown in TABLE 5 is the position of two switches. Accordingly, to transition from one set of states to the next, the control circuit 114 may need to open a single switch and close a single switch.

Referring back to FIG. 3, at 206, the control circuit 114 may cycle the pole switch banks 16, 18 sequentially back-and-forth between states that draw the output of the inverter 10 between the DC input voltage and ⅔ of the DC input voltage. For example, TABLE 6 below illustrates a sequence of switch bank states that cycle the switch banks 16, 18 to draw the output of the inverter 10 alternately to the DC input voltage and ⅔ of the DC input voltage:

TABLE 6

| | First Bank 16 State (Switches Closed) | Second Bank 18 State (Switches Closed) | Output Voltage (First Pole 8 - Second Pole 11) |
|---|---|---|---|
| 1 | First (S1a, S2a, S3a) | Third (S3b, S4b, S5b) | ⅔ DC input voltage (DC input voltage - ⅓ DC input voltage) |
| 2 | First (S1a, S2a, S3a) | Fourth (S4b, S5b, S6b) | DC input voltage (DC input voltage - zero) |
| 3 | Second (S2a, S3a, S4a) | Fourth (S4b, S5b, S6b) | ⅔ DC input voltage (⅔ DC input voltage - zero) |

The control circuit 114 may configure the pole switch banks 16, 18 to traverse the states shown in TABLE 6 sequentially back-and-forth. For example, the control circuit 114 may proceed from the states of Row 1 (First, Third), to the states of Row 2 (First, Fourth), to the states of Row 3 (Second, Fourth), to the states of Row 2 (First, Fourth) and so on. As shown, the difference between consecutive sets of states is the position of two switches, allowing the control circuit 114 to move between any two consecutive set of states from the TABLE 6 by opening a single switch and closing a single switch. The control circuit 114 may continue to cycle sequentially back-and-forth between the states shown in TABLE 6 for a third period. The third period, for example, may be about 4 ms. Referring to FIG. 4, in the example third period 306, the output of the inverter 10 cycles between 300 Volts (⅔ of the 450 Volt DC input voltage) and 450 Volts (the DC input voltage).

Again referring back to FIG. 3, as 208, the control circuit 114 may again cycle the pole switch banks 16, 18 sequentially back-and-forth between states that draw the output of the inverter 10 between ⅓ of the DC input voltage and ⅔ of the DC input voltages, for example, as described herein above with respect to TABLE 5. This may continue for a fourth period, which may be, for example, 1 ms. This is illustrated in FIG. 4 by the example fourth period 308. At 210 of FIG. 3, the control circuit 114 may cycle the pole switch banks 16, 18 sequentially back-and-forth between states that draw the output of the inverter 10 to ⅓ of the DC input voltage and zero, for example, as described herein above with respect to TABLE 4. This may continue for a fifth period, which may be, for example, 1 ms. An example fifth period 310 is shown in FIG. 4.

At 212 of the process flow 200, the control circuit 114 may cycle the pole switch banks 16, 18 sequentially back-and-forth between states that draw the output of the inverter 10 between to zero and −⅓ of the DC input voltage. For example, TABLE 7 below illustrates a sequence of switch bank states that cycle the switch banks 16, 18 to draw the output of the inverter 10 alternately to zero and −⅓ of the DC input voltage:

TABLE 7

| | First Bank 16 State (Switches Closed) | Second Bank 18 State (Switches Closed) | Output Voltage (First Pole 8 - Second Pole 11) |
|---|---|---|---|
| 1 | First (S1a, S2a, S3a) | First (S1b, S2b, S3b) | 0 Volts (DC input voltage - DC input voltage) |

TABLE 7-continued

| First Bank 16 State (Switches Closed) | Second Bank 18 State (Switches Closed) | Output Voltage (First Pole 8 - Second Pole 11) |
|---|---|---|
| 2 Second (S2a, S3a, S4a) | First (S1b, S2b, S3b) | −⅓ DC input voltage (⅔ DC input voltage - ⅓ DC input voltage) |
| 3 Second (S2a, S3a, S4a) | Second (S2b, S3b, S4b) | 0 Volts (⅔ DC input voltage - ⅔ DC input voltage) |
| 4 Third (S3a, S4a, S5a) | Second (S2b, S3b, S4b) | −⅓ DC input voltage (⅓ DC input voltage - ⅔ DC input voltage) |
| 5 Third (S3a, S4a, S5a) | Third (S3b, S4b, S5b) | 0 Volts (⅓ DC input voltage - ⅓ DC input voltage) |
| 6 Fourth (S4a, S5a, S6a) | Third (S3b, S4b, S5b) | −⅓ DC input voltage (zero - ⅓ DC input voltage) |
| 7 Fourth (S4a, S5a, S6a) | Fourth (S4b, S5b, S6b) | 0 Volts (zero-zero) |

The control circuit 114 may configure the pole switch banks 16, 18 to traverse the states shown in TABLE 7 sequentially back-and-forth. For example, the control circuit 114 may proceed from the states of Row 1 (First, First), to the states of Row 2 (Second, First), to the states of Row 3 (Second, Second), to the states of Row 4 (Third, Second), to the states of Row 5 (Third, Third), to the states of Row 6 (Fourth, Third), to the states of Row 7 (Fourth, Fourth), and then back to Rows 6, 5, 4, 3, 2 and 1 again, and so on, as described above. The control circuit 114 may continue to cycle sequentially back-and-forth between the states shown in TABLE 7 for a sixth period, which may be about 1 ms, as described above. Similar to the sequences shown at TABLES 4, 5 and 6, each consecutive set of states from the TABLE 7 may differ only by the positions of two switches. Also, FIG. 4 shows an example sixth period 312. In the example of FIG. 4, during the sixth period 312, the output of the inverter cycles between zero and −150 Volts (−⅓ of the DC input voltage).

At 214 of the process flow 200, the control circuit may cycle the pole switch banks 16, 18 sequentially back-and-forth between states that draw the output of the inverter 10 between −⅓ of the DC input voltage and −⅔ of the DC input voltage. For example, TABLE 8 below illustrates a sequence of switch bank states that cycle the switch banks 16, 18 to draw the output of the inverter 10 alternately between −⅓ of the DC input voltage and −⅔ of the DC input voltage:

TABLE 8

| First Bank 16 State (Switches Closed) | Second Bank 18 State (Switches Closed) | Output Voltage (First Pole 8 - Second Pole 11) |
|---|---|---|
| 1 Second (S2a, S3a, S4a) | First (S1b, S2b, S3b) | −⅓ DC input voltage (⅔ DC input voltage - DC input voltage) |
| 2 Third (S3a, S4a, S5a) | First (S1b, S2b, S3b) | −⅔ DC input voltage (⅓ DC input voltage - DC input voltage) |
| 3 Third (S3a, S4a, S5a) | Second (S2b, S3b, S4b) | −⅓ DC input voltage (⅓ DC input voltage - ⅔ DC input voltage) |
| 4 Fourth (S4a, S5a, S6a) | Second (S2b, S3b, S4b) | −⅔ DC input voltage (zero - ⅔ DC input voltage) |
| 5 Fourth (S4a, S5a, S6a) | Third (S3b, S4b, S5b) | −⅓ DC input voltage (zero - ⅓ DC input voltage) |

The control circuit 114 may configure the pole switch banks 16, 18 to traverse the states shown in TABLE 8 sequentially back-and-forth. For example, the control circuit may proceed from the states of Row 1 (Second, First), to the states of Row 2 (Third, First), to the states of Row 3 (Third, Second), to the states of Row 4 (Fourth, Second), to the states of Row 5 (Fourth, Third) and then back to Row 4, Row 3, Row 2 and Row 1 again, as described above. The control circuit 114 may continue to cycle sequentially back-and-forth between the states shown in TABLE 8 for a seventh period. In some examples, the seventh period may be 1 ms. For example, referring to FIG. 4, in the example seventh period 314, the output of the inverter 10 cycles between −150 Volts (⅓ of the 450 Volt DC input voltage) and −300 Volts (−⅔ of the 450 Volt DC input voltage). Similar to what was described at 202, it is noted that the difference between each consecutive set of states is the position of two switches.

At 216 of the process flow 200, the control circuit 114 may cycle the pole switch banks 16, 18 sequentially back-and-forth between states that draw the output of the inverter 10 alternately to the negative DC input voltage and −⅔ of the DC input voltage. For example, TABLE 9 below illustrates a sequence of switch bank states that cycle the switch banks 16, 18 to draw the output of the inverter 10 alternately to the negative DC input voltage and −⅔ of the DC input voltage:

TABLE 9

| First Bank 16 State (Switches Closed) | Second Bank 18 State (Switches Closed) | Output Voltage (First Pole 8 - Second Pole 11) |
|---|---|---|
| 1 Third (S3a, S4a, S5a) | First (S1b, S2b, S3b) | −⅔ DC input voltage (⅓ DC input voltage - DC input voltage) |
| 2 Fourth (S4a, S5a, S6a) | First (S1b, S2b, S3b) | −DC input voltage (zero - DC input voltage) |
| 3 Fourth (S4a, S5a, S6a) | Second (S2b, S3b, S4b) | −⅔ DC input voltage (zero - ⅔ DC input voltage) |

The control circuit 114 may configure the pole switch banks 18 to traverse the state sets shown in TABLE 9 sequentially back-and-forth. For example, the control circuit 114 may proceed from the states of Row 1 (Third, First), to the states of Row 2 (Fourth, First), to the sates of Row 3 (Second, Fourth) t the states of Row 2 (Fourth, First) and so on. As shown, the difference between consecutive sets of state is the position of two switches, as described herein. The control circuit 114 may continue to cycle sequentially back-and forth-between the states shown in TABLE 9 for an eighth period. The eighth period maybe, for example, about 4 ms. Referring to FIG. 4, in the example eighth period 316, the output of the inverter 10 cycles between −300 Volts (−⅔ of the 450 Volt DC input voltage) and −450 Volts (the negative of the DC input voltage).

At 218, the control circuit 114 may again cycle the pole switch banks 16, 18 sequentially back-and-forth between sets of states that alternately draw the output of the inverter 10 to −⅓ of the DC input voltage and −⅔ of the DC input voltage, for example, as described herein with respect to TABLE 8. This may continue for a ninth period, which may be, for example, 1 ms. An example ninth period 318 is shown in FIG. 4. At 220, the control circuit 114 may cycle the pole switch banks 16, 18 sequentially back-and-forth between states that draw the output of the inverter 10 to zero and −⅓ of the DC input voltage, for example, as described herein with respect to TABLE 7. This may continue for a tenth period, which may be, for example, 1 ms. An example tenth period 320 is shown in FIG. 4.

The process flow 200 may represent one period of a waveform such as 300, 120. In various examples, the control circuit 114 may execute the process flow 200 repeatedly to generate a repeating waveform. Although example lengths for the first through tenth periods are provided herein, it will be appreciated that the lengths of the periods may be modified to modify the shape of the resulting waveform. The frequency with which the control circuit cycles between consecutive sets of pole switch bank states within each period (e.g., a switching frequency) may be any suitable value. For example, higher switching frequencies may reduce the presence of low frequency components in the waveform, thereby reducing the inductance and capacitance needed in the filter 116. Also, for example, higher switching frequencies may lead to more switching losses. In some examples, the switching frequency may be about 10 kHz.

Figure 5:
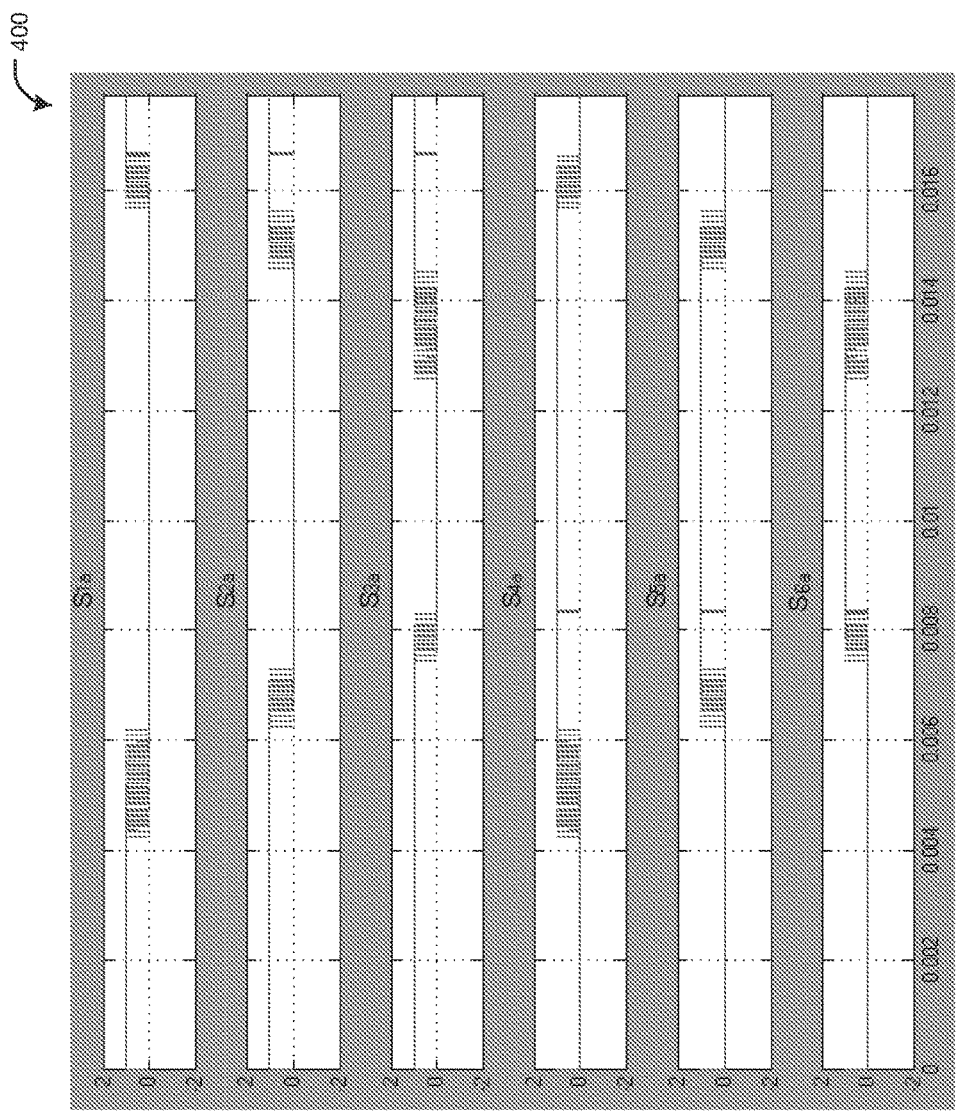
FIG. 5 is a diagram showing time patterns for the switches of the first pole switch bank during execution of the process flow of FIG. 3 to create the example waveform of FIG. 4.
Figure 6:
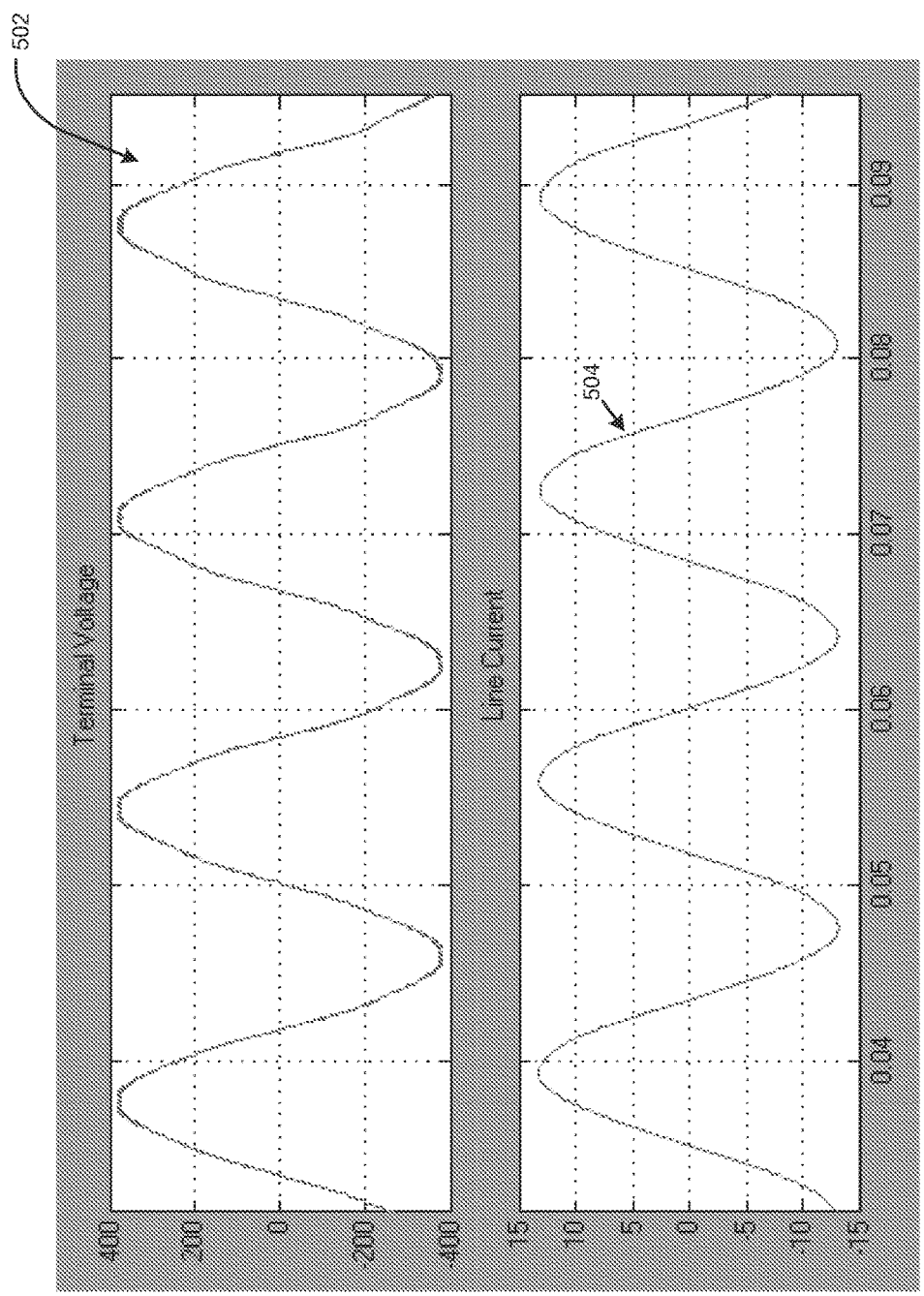
FIG. 6 is a diagram showing one example of voltage and current after filtering of the waveform of FIG. 4.

FIG. 5 is a diagram 400 showing timing sequence for the switches S1a, S2a, S3a, S4a, S5a, S6a of the first pole switch bank 16 that may cause the inverter 10 to generate an output waveform similar to the waveform 300. For example, the timing FIG. 6 is a diagram showing one example of voltage 502 and current 504 after filtering of the waveform 300. For example, the voltage 502 may be 240 AC rms.

Figure 7:
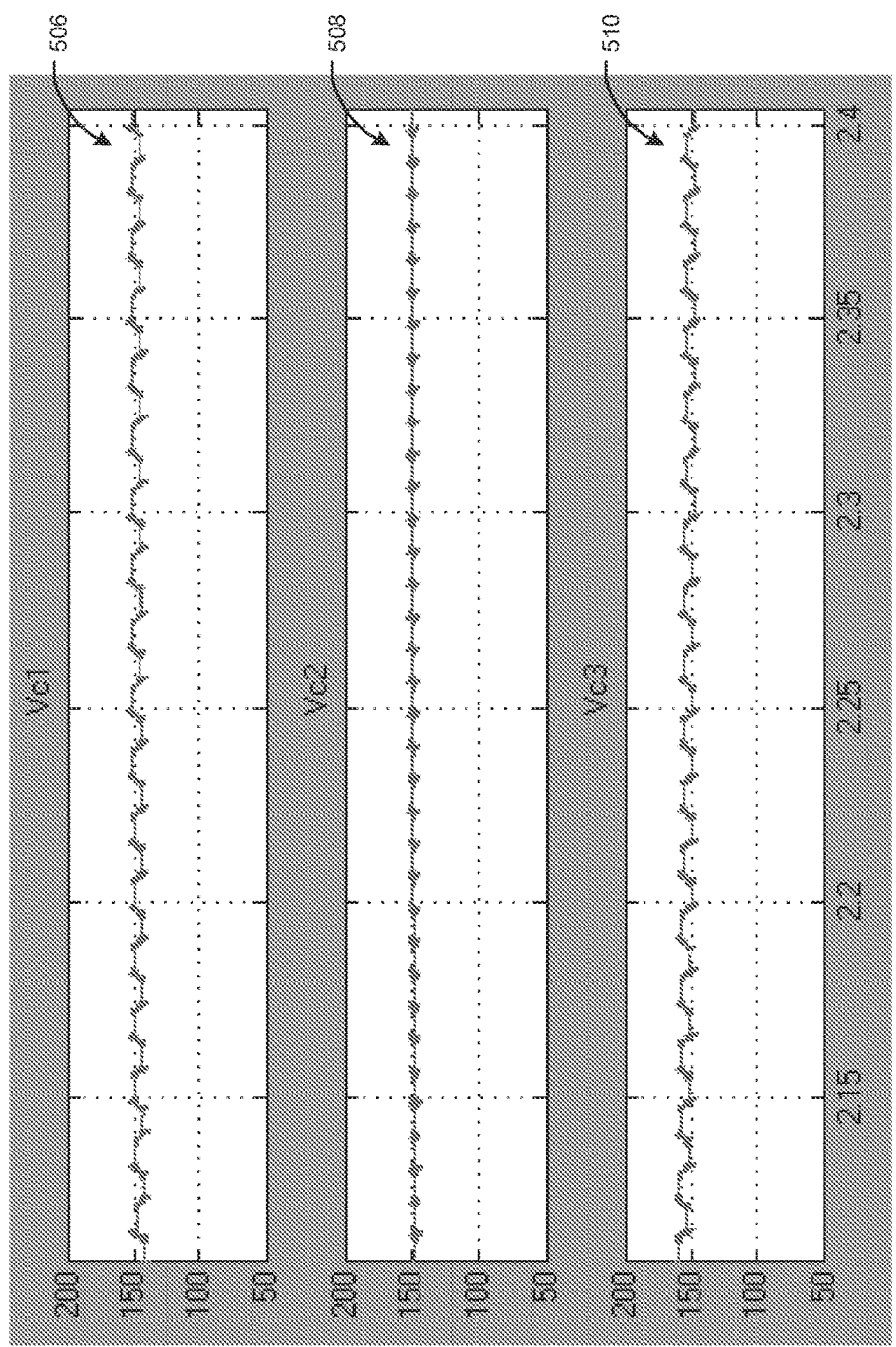
FIG. 7 is a diagram showing one example of the charge on the capacitors of the inverter of FIG. 1 during execution of the process flow of FIG. 3.

FIG. 7 is a diagram showing one example of the charge on the capacitors C1, C2 and C3 during execution of the process flow 200. For example, as the control circuit 114 cycles the pole switch banks 16, 18 through the states indicated in TABLES 4-9, it may evenly draw and/or sink current to each of the capacitors C1, C2, C3, resulting in smooth charge levels for the capacitors C1, C2, C3. For example, in each of the sequences of switch bank states in TABLES 4-9, the control circuit 114 steps the switch banks from the first through fourth states and then back again. For example, referring to TABLE 4, in Row 1, no current is drawn or sunk. In Row 2, the first pole 8 draws from capacitors C1, C2 and C3 while the second pole 11 draws and/or sinks from capacitors C2 and C3. In Row 3, both poles 8, 11 draws and/or sinks from capacitors C2 and C3. In Row 4, the first pole 8 draws and/or sinks from the second and third capacitors C2, C3 while the second pole 11 draws and/or sinks from the third capacitor C3. In Row 5, both poles draw and/or sink from capacitor C3 while in Row 7, no current is drawn. Accordingly, as the control circuit 114 cycles through the sets of states in TABLES 4-9, it also sequentially draws current from and sinks current to the capacitors C1, C2, C3.

Figure 8:
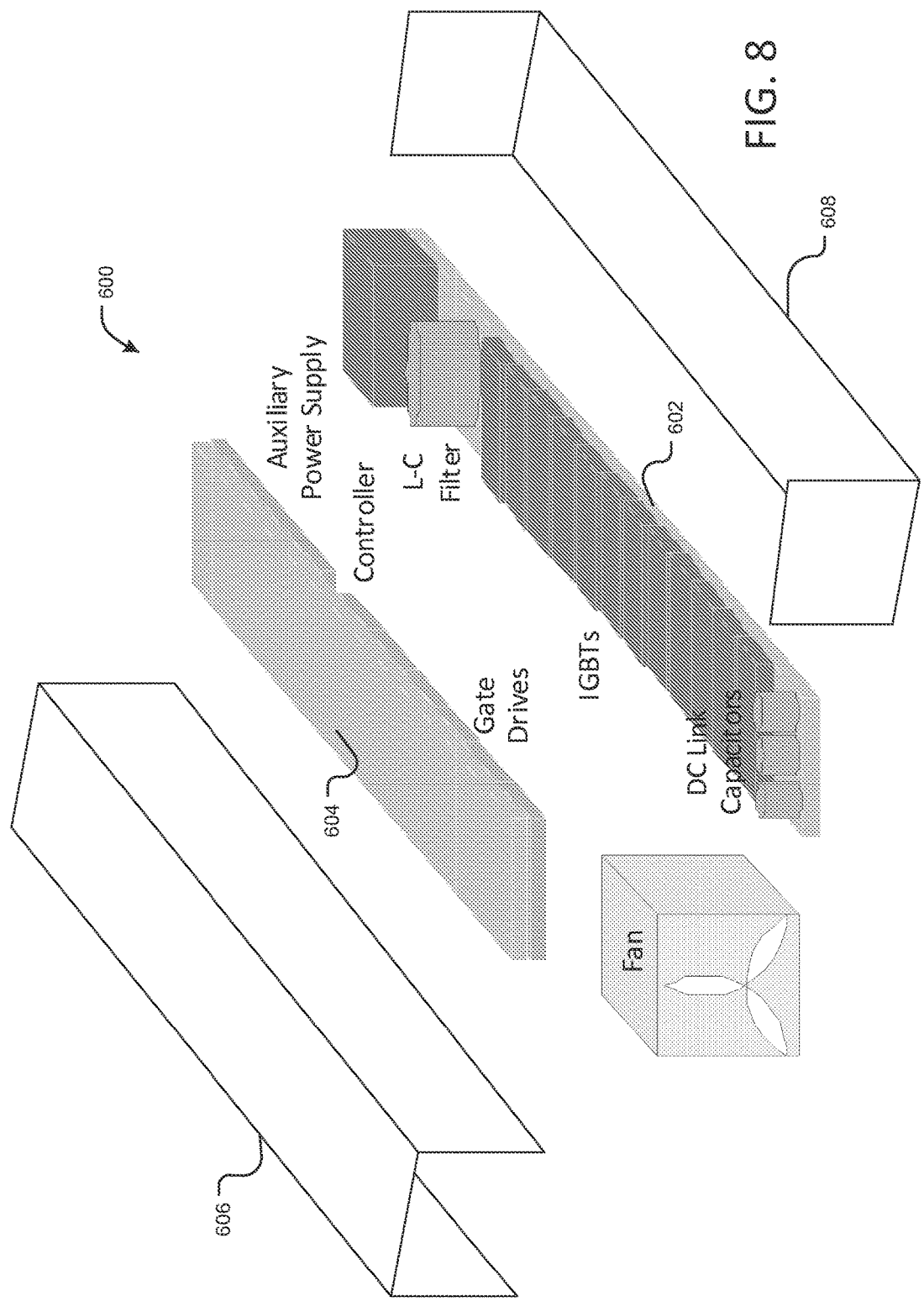
FIG. 8 is a diagram showing one example of a housing for the inverter system described herein.

FIG. 8 is a diagram showing one example of a housing 600 for the inverter system 100. For example, an enclosure base PC board 602 may house the switches S1a, S2a, S3a, S4a, S5a, S6a, S1b, S2b, S3b, S4b, S5b, S6b. For example, in FIG. 8, the twelve switches are illustrated as twelve TO-247 packages, each including two Insulated Gate Bipolar Junction Transistors (IGBJTs). The capacitors C1, C2, C3 are also placed on the PC board 602, shown as DC link Capacitors. The filter 116 is positioned on the PC board 602 and labeled L-C Filter. An auxiliary power supply is also shown on the PC board 602. For example, the auxiliary power supply may provide a stepped-down DC power rail for one or more microprocessors of the controller 114. A second PC board 604 may be positioned opposite the base PC board 602. The PC board 604 may include the controller, embodied as a microcontroller and associated hardware. The second PC board 604 may also comprise gate drives. The gate drives, for example, may translate the digital output of the microcontroller or microprocessor of the controller to a current or other suitable signal that may be provided to the bases or other suitable terminal of the switches to close the switches. A fan, as illustrated, may be positioned between the PC boards 602, 604. The various components shown in FIG. 8 may be positioned between enclosure portions 606, 608, as shown. In some examples, the housing 600 may be less than 40 square inches. This may allow the system 100 to have a power to volume ratio of between 50 W/in$^3$ and 100 W/in$^3$.

Figure 9:
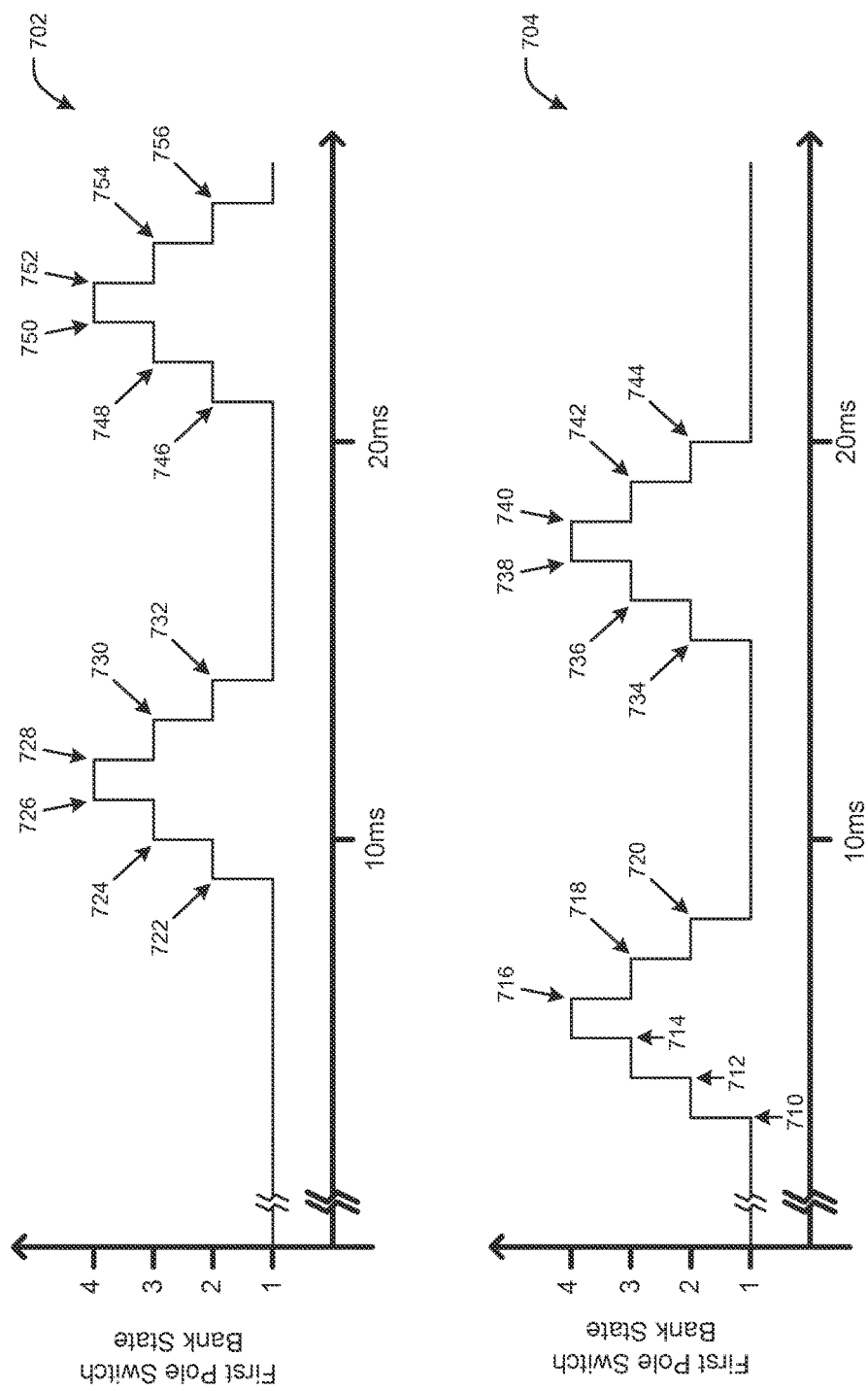
FIGS. 9 and 10 show switching sequences (FIG. 9) and a resulting waveform (FIG. 10) showing one example of an alternate switching sequence that the control circuit may implement to control the switches of the inverter.
Figure 10:
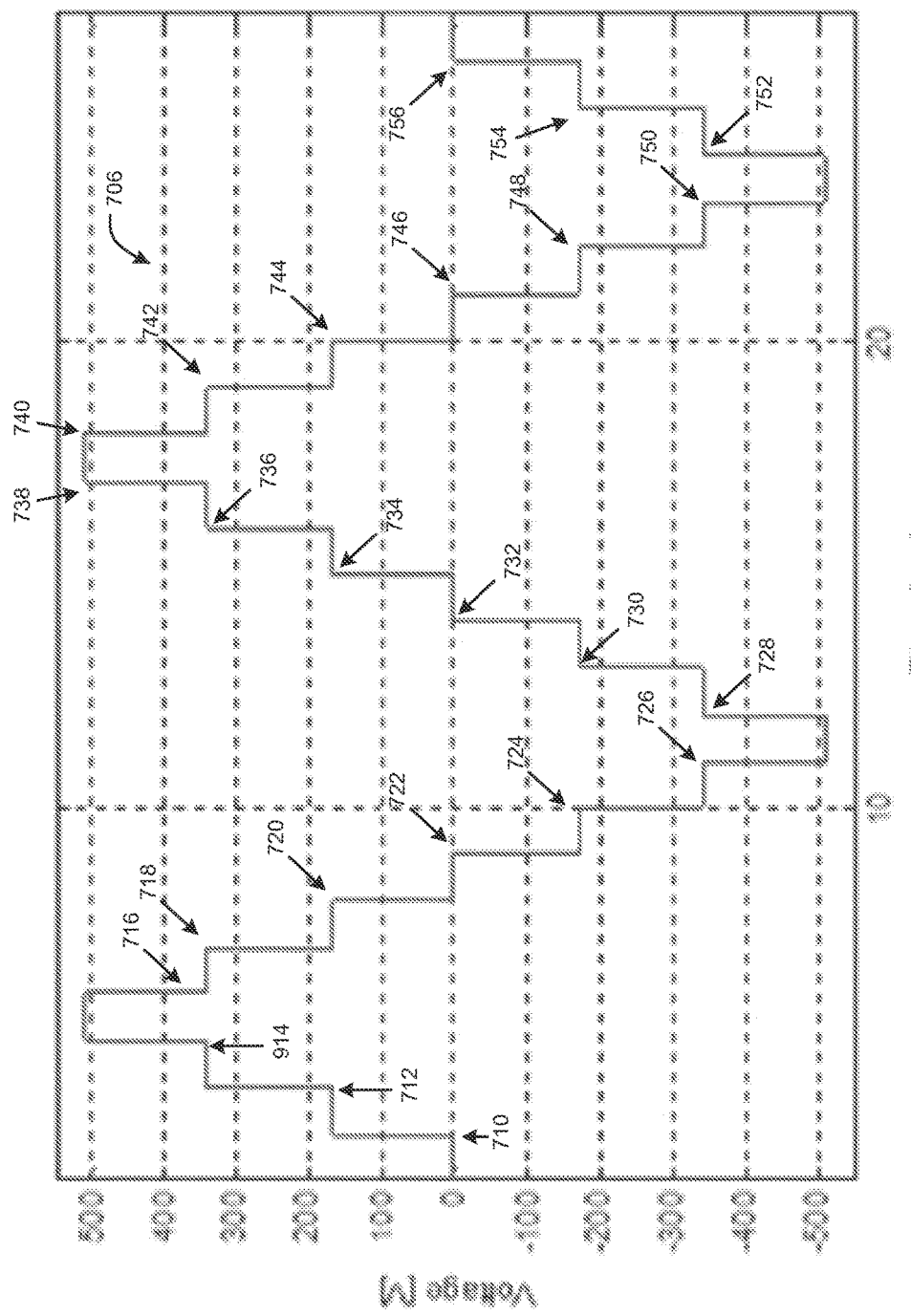

FIGS. 9 and 10 show switching sequences 702, 704 (FIG. 9) and a resulting waveform 706 showing one example of an alternate switching sequence that the control circuit 114 may implement to control the switches of the inverter 10. Switching sequence 702 shows states of the first pole switch bank 16. Switching sequence 704 shows states of the second pole switch bank 18. In the example of FIGS. 9 and 10, the DC input voltage may be 500 Volts. The waveform 706 may follow a generally sinusoidal shape in increments of 166 Volts (e.g., 500 V/3). For example, seven levels of the waveform 706 may include 0 Volts, 166 Volts, 333 Volts, 500 Volts, −166 Volts and −333 Volts.

In some examples, the output of the inverter 10 may be 0 Volts when both the first and second pole switch banks 16, 18 are in the first state. At transition 710, the control circuit 114 may cycle the second pole switch bank 18 to the second state, causing the output of the inverter 10 to increase from 0 Volts to 166 Volts (e.g., ⅓ DC input voltage in the example of FIGS. 9 and 10). At transition 712, the control circuit 114 may cycle the second pole switch bank 18 to the third state, causing the output of the inverter 10 to increase from 166 Volts to 333 Volts (e.g., ⅔ of the DC input voltage in the example of FIGS. 9 and 10). At transition 714, the control circuit 114 may cycle the second pole switch bank 18 to the fourth state, causing the output of the inverter 10 to increase from 333 Volts to 500 Volts. At transition 716, the control circuit 114 may cycle the second pole switch bank 18 back to the third state, causing the output of the inverter 10 to decrease from 500 Volts to 333 Volts. At transition 718, the control circuit 114 may cycle the second pole switch bank 18 back to the second state, causing the output of the inverter 10 to decrease from 333 Volts to 166 Volts. At transition 720, the control circuit 114 may cycle the second pole switch bank 18 back to the first state, causing the output of the inverter 10 to decrease to zero. At transition 722, the control circuit 114 may cycle the first pole switch bank 16 to the second state, causing the output of the inverter 10 to decrease from zero to −166 Volts. At transition 724, the control circuit 114 may cycle the first pole switch bank 16 to the third state, causing the output of the inverter 10 to decrease from −166 Volts to −333 Volts. At transition 726, the control circuit 114 may cycle the first pole switch bank 16 to the fourth state, causing the output of the inverter 10 to decrease from −333 Volts to −500 Volts. At transition 728, the control circuit 114 may cycle the first pole switch bank 16 to the third state, causing the output of the inverter 10 to increase from −500 Volts to −333 Volts. At transition 730, the control circuit 114 may cycle the first pole switch bank 16 to the second state, causing the output of the inverter 10 to increase from −333 Volts to −166 Volts. At transition 732, the control circuit 114 may cycle the first pole switch bank 16 to the first state causing the output of the inverter to increase from −166 volts to zero. Relative to the first transition at 710, this may complete one cycle of the waveform 706.

FIGS. 9 and 10 also show a second cycle of the waveform 706. For example, At transition 734, the control circuit 114 may cycle the second pole switch bank 18 to the second state, causing the output of the inverter 10 to increase from 0 Volts to 166 Volts (e.g., ⅓ DC input voltage in the example of FIGS. 9 and 10). At transition 736, the control circuit 114 may cycle the second pole switch bank 18 to the third state, causing the output of the inverter 10 to increase from 166 Volts to 333 Volts (e.g., ⅔ of the DC input voltage in the example of FIGS. 9 and 10). At transition 738, the control circuit 114 may cycle the second pole switch bank 18 to the fourth state, causing the output of the inverter 10 to increase from 333 Volts to 500 Volts. At transition 740, the control circuit 114 may cycle the second pole switch bank 18 back to the third state, causing the output of the inverter 10 to decrease from 500 Volts to 333 Volts. At transition 742, the control circuit 114 may cycle the second pole switch bank 18 back to the second state, causing the output of the inverter 10 to decrease from 333 Volts to 166 Volts. At transition 744, the control circuit 114 may cycle the second pole switch bank 18 back to the first state, causing the output of the inverter 10 to decrease to zero. At transition 746, the control circuit 114 may cycle the first pole switch bank 16 to the second state, causing the output of the inverter 10 to decrease from zero to −166 Volts. At transition 748, the control circuit 114 may cycle the first pole switch bank 16 to the third state, causing the output of the inverter 10 to decrease from −166 Volts to −333 Volts. At transition 750, the control circuit 114 may cycle the first pole switch bank 16 to the fourth state, causing the output of the inverter 10 to decrease from −333 Volts to −500 Volts. At transition 752, the control circuit 114 may cycle the first pole switch bank 16 to the third state, causing the output of the inverter 10 to increase from −500 Volts to −333 Volts. At transition 754, the control circuit 114 may cycle the first pole switch bank 16 to the second state, causing the output of the inverter 10 to increase from −333 Volts to −166 Volts. At transition 756, the control circuit 114 may cycle the first pole switch bank 16 to the first state causing the output of the inverter 10 to increase from −166 volts to zero. Relative to the first transition at 710, this may complete a second cycle of the waveform 706. It will be appreciated that the transitions between pole switch bank states shown in FIG. 9 are not the only transitions that would generate the waveform shown in FIG. 10.

In various examples, the inverter system 100 may generate an output AC signal 122 with oscillating real power. Oscillations to the power of the output AC signal 122 may reflect onto the input side (e.g., the input DC signal and its voltage), which may cause a harmonic ripple in the input. This harmonic ripple may be addressed in any suitable manner. For example, the capacitance of the capacitors C1, C2, C3 may be increased to damp the ripple. Also, for example, an LC power filter may be utilized at the input (e.g., between the DC source 102 and the inverter 10). In some examples, however, the control circuit 114 may be programmed to address input ripple by generating an inverse of the expected input ripple on the AC signal 122. For example, the control circuit 114 may modify the switching frequency and/or the various periods of it switching sequence (e.g., such as the sequences described herein) to generate a second harmonic of the expected ripple.

Figure 11:
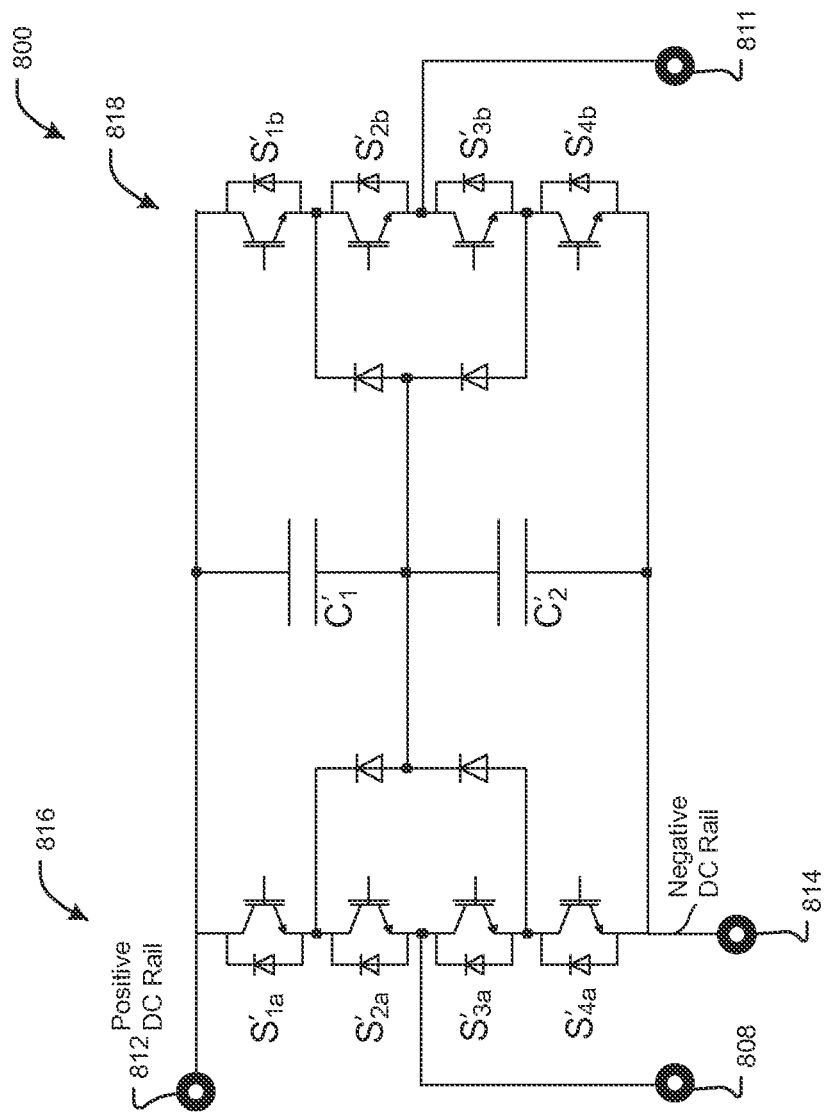
FIG. 11 is a diagram showing another example of an inverter for converting DC to AC.

FIG. 11 is a diagram showing another example of an inverter 800 for converting DC to AC. The inverter 800 may receive the DC input voltage at a DC bus comprising a positive DC rail 812 and a negative DC rail 814. The inverter 800 may be incorporated into an inverter system similar to the system 100 described herein with respect to FIG. 2. For example, switch banks 816, 818 of the inverter 800 may be controlled by a control circuit similar to the control circuit 114 described herein. Also, an output waveform of the inverter 800 may be provided to a filter, similar to the filter 116 described herein. The inverter 802 comprises two capacitors C1' and C2'. Similar to the inverter 10, each of the capacitors C1' and C2' may drop ½ of the DC input voltage. A first switch bank 816 comprises four switches S1a', S2a', S3a' and S4a'. A first pole 808 is connected between the switches S1a', S2a', S3a' and S4a' as illustrated. The switches S1a', S2a', S3a' and S4a' may be configurable to three different states, as indicated by TABLE 10 below:

TABLE 10

| State | Switches Closed | Voltage at First Pole 808 |
|---|---|---|
| First | S1a', S2a' | DC input voltage |
| Second | S2a', S3a' | ½ DC input voltage |
| Third | S3a', S4a' | Zero (negative DC rail) |

A second switch bank 818 also comprises four switches S1b', S2b', S3b' and S4b' configurable to three different states, indicated by TABLE 11 below:

TABLE 11

| State | Switches Closed | Voltage at Second Pole 811 |
|---|---|---|
| First | S1b', S2b' | DC input voltage |
| Second | S2b', S3b' | ½ DC input voltage |
| Third | S3b', S4b' | Zero (negative DC rail) |

Accordingly, the inverter 800 may be configurable to five different levels indicated by TABLE 12:

TABLE 12

| Output Level | First Pole Switch Bank State(s) | Second Pole Switch Bank State(s) |
|---|---|---|
| DC input voltage | (1) First (First Pole 808 = DC input voltage) | (1) Third (Second Pole 811 = Zero) |
| ½ DC input voltage | (1) First (First Pole 808 = DC input voltage) | (1) Second (Second Pole 811 = ½ DC input voltage) |
| | (2) Second (First Pole 808 = ½ DC input voltage) | (2) Third (Second Pole 811 = Zero) |
| 0 (negative rail of DC input voltage) | (1) First (First Pole 808 = DC input voltage) | (1) First (Second Pole 811 = DC input voltage) |
| | (2) Second (First Pole 808 = ½ DC input voltage) | (2) Second (Second Pole 811 = ½ DC input voltage) |
| | (3) Third (First Pole 808 = Zero) | (3) Third (Second Pole 811 = Zero) |
| −½ DC input voltage | (1) Second (First Pole 808 = ½ DC input voltage) | (1) First (Second Pole 811 = DC input voltage) |
| | (2) Third (First Pole 808 = Zero) | (2) Second (Second Pole 811 = ½ DC input voltage) |

TABLE 12-continued

| Output Level | First Pole Switch Bank State(s) | Second Pole Switch Bank State(s) |
|---|---|---|
| −DC input voltage | (1) Third (First Pole 808 = Zero) | (1) First (Second Pole 811 = DC input voltage) |

Any suitable switching sequence may be utilized for the inverter 800. For example, during a first period, the control circuit may modulate the switch banks 816, 818 to toggle the output of the inverter 800 between the zero and ½ of the DC input voltage. An example switching sequence for doing so is provided by TABLE 13 below:

TABLE 13

| | First Bank 816 State (Switches Closed) | Second Bank 818 State (Switches Closed) | Output Voltage (First Pole 808-Second Pole 811) |
|---|---|---|---|
| 1 | First (S1a', S2a') | First (S1b', S2b') | 0 Volts (DC input voltage-DC input voltage) |
| 2 | First (S1a', S2a') | Second (S2b', S3b') | ½ DC input voltage (DC input voltage-½ DC input voltage) |
| 3 | Second (S2a', S3a') | Second (S2b', S3b') | 0 Volts (½ DC input voltage-½ DC input voltage) |
| 4 | Second (S2a', S3a') | Third (S3b', S4b') | ½ DC input voltage (½ DC input voltage-Zero) |
| 5 | Third (S3a', S4a') | Third (S3b', S4b') | 0 Volts (Zero-Zero) |

As described herein with respect to the switching of the inverter 10, the control circuit may configure the inverter 800 to traverse the sequence of states shown in TABLE 13 sequentially back-and-forth.

During a second period, the control circuit may modulate the switch banks 816, 818 to toggle the output voltage of the inverter 800 between ½ of the DC input voltage and the DC input voltage. An example switching sequence for doing so is provided by TABLE 14 below:

TABLE 14

| | First Bank 816 State (Switches Closed) | Second Bank 818 State (Switches Closed) | Output Voltage (First Pole 808-Second Pole 811) |
|---|---|---|---|
| 1 | First (S1a', S2a') | Second (S2b', S3b') | ½ DC input voltage (DC input voltage-½ DC input voltage) |
| 2 | First (S1a', S2a') | Third (S3b', S4b') | DC input voltage (DC input voltage-Zero) |
| 3 | Second (S2a', S3a') | Third (S3b', S4b') | ½ DC input voltage (DC input voltage-½ DC input voltage) |

The control circuit may configure the inverter 800 to traverse the sequences of states shown in TABLE 14 sequentially back-and-forth, as described herein.

During a third period, the control circuit may modulate the switch banks 816, 818 to toggle the output voltage of the inverter 800 again between ½6 of the DC input voltage and zero, for example, using the sequence of TABLE 13. During a fourth period, the control circuit may modulate the switch banks 816, 818 to toggle the output voltage of the inverter 800 between zero and −½ of the DC input voltage. An example switching sequence for doing so is provided by TABLE 15 below:

TABLE 15

| | First Bank 816 State (Switches Closed) | Second Bank 818 State (Switches Closed) | Output Voltage (First Pole 808-Second Pole 811) |
|---|---|---|---|
| 1 | First (S1a', S1a') | First (S1b', S2b') | Zero (DC input voltage-DC input voltage) |
| 2 | Second (S2a', S3a') | First (S1b', S2b') | −½ DC input voltage (½ DC input voltage-DC input voltage) |
| 3 | Second (S2a', S3a') | Second (S2b', S3b') | Zero (½ DC input voltage-½ DC input voltage) |
| 4 | Third (S3a', S4a') | Second (S2b', S3b') | −½ DC input voltage (Zero-½ DC input voltage) |
| 5 | Third (S3a', S4a') | Third (S3b', S4b') | Zero (Zero-Zero) |

The control circuit may configure the inverter 800 to traverse the sequences of states shown in TABLE 15 sequentially back-and-forth, as described herein.

During a fifth period, the control circuit may modulate the switch banks 816, 818 to toggle the output voltage of the inverter 800 between −½ of the DC input voltage and −DC input voltage. An example switching sequence for doing so is provided by TABLE 16 below:

TABLE 16

| | First Bank 816 State (Switches Closed) | Second Bank 818 State (Switches Closed) | Output Voltage (First Pole 808-Second Pole 811) |
|---|---|---|---|
| 1 | Second (S2a', S3a') | First (S1b', S2b') | −½ DC input voltage (½ DC input voltage-DC input voltage) |
| 2 | Third (S3a', S4a') | First (S1b', S2b') | −DC input voltage (Zero-DC input voltage) |
| 3 | Third (S3a', S4a') | Second (S2b', S3b') | −½ DC input voltage (Zero-½ DC input voltage) |

The control circuit may configure the inverter 800 to traverse the sequences of states shown in TABLE 16 sequentially back-and-forth, as described herein.

During a sixth period, the control circuit may modulate the switch banks 816, 818 to toggle the output voltage of the inverter 800 again between −½ of the DC input voltage and zero, for example, as shown by TABLE 15. In some examples, the control circuit may implement the six periods described with respect to the inverter 800 to implement one cycle of an output waveform. The shape of the waveform may be modified, for example, by varying the length of the various periods. This waveform sequence, however, is just one way that the inverter 800 may be used. Any suitable switching sequence may be used to achieve any suitable type of waveform, for example, while enjoying some or all of the benefits described herein.

Figure 12:
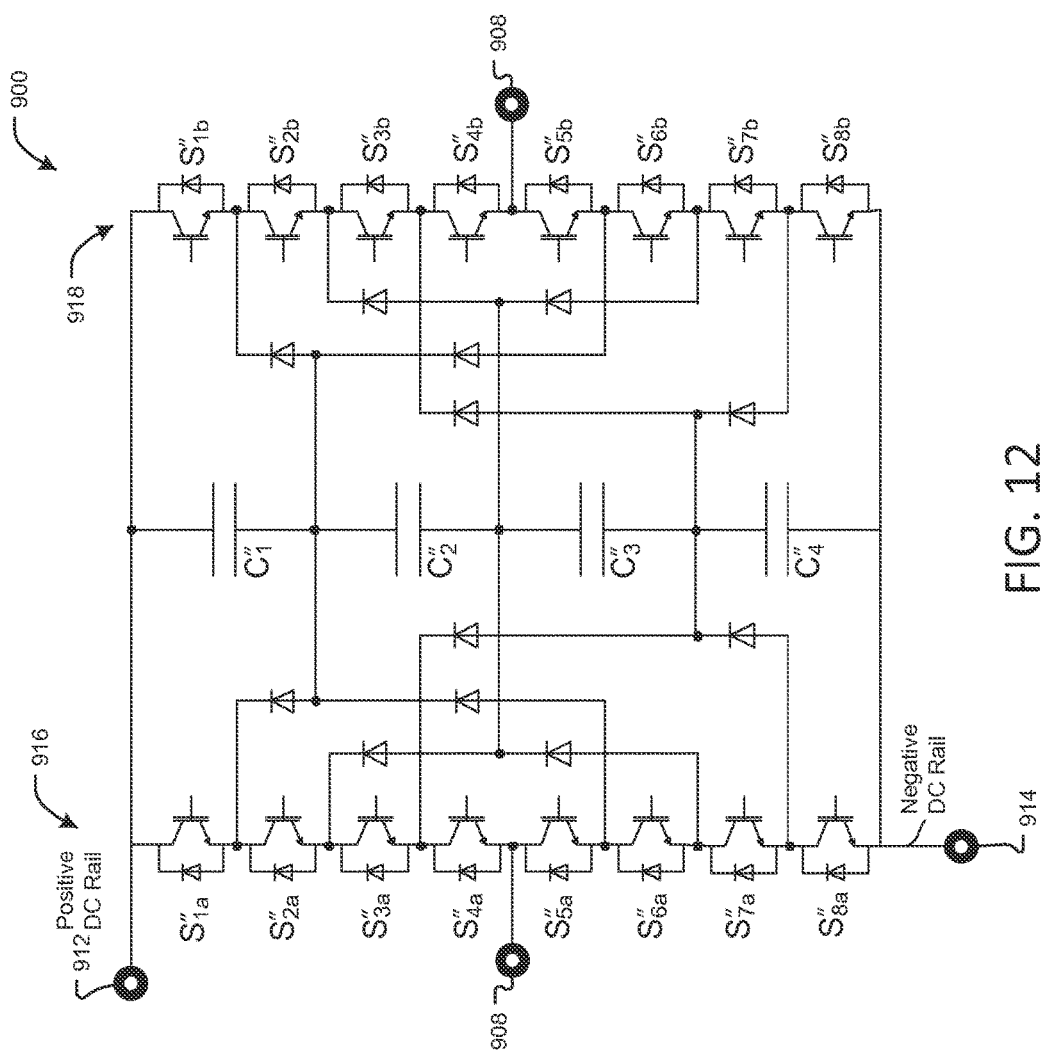
FIG. 12 is a diagram showing yet another example of an inverter for converting DC to AC.

FIG. 12 is a diagram showing yet another example of an inverter 900 for converting DC to AC. The inverter 900 may receive the DC input voltage at a DC bus comprising a positive DC rail 912 and a negative DC rail 914. The inverter 900 may be incorporated into an inverter system similar to the system 100 described herein with respect to FIG. 2. For example, switch banks 916, 918 of the inverter 900 may be controlled by a control circuit similar to the control circuit 114 described herein. Also, an output waveform of the inverter 900 may be provided to a filter, similar to the filter 116 described herein. The inverter 900 comprises three capacitors C1", C2", C3" and C4". Each capacitor may drop ¼ of the DC input voltage. A first switch bank 916 comprises eight switches S1a", S2a", S3a", S4a", S5a", S6a", S7a" and S8a". The switches S1a", S2a", S3a", S4a", S5a", S6a", S7a" and S8a" may be configurable to five different states, as indicated by TABLE 17 below:

TABLE 17

| State | Switches Closed | Voltage at First Pole 908 |
|---|---|---|
| First | S1a", S2a", S3a", S4a" | DC input voltage |
| Second | S2a", S3a", S4a", S5a" | ¾ DC input voltage |
| Third | S3a", S4a", S5a", S6a" | ½ DC input voltage |

TABLE 17-continued

| State | Switches Closed | Voltage at First Pole 908 |
|---|---|---|
| Fourth | S4a", S5a", S6a", S7a" | ¼ DC input voltage |
| Fifth | S5a", S6a", S7a", S8a" | Zero (negative DC rail) |

A second switch bank 918 also comprises eight switches S1b", S2b", S3b", S4b", S5b", S6b", S7b" and S8b" configurable to five different states, indicated by TABLE 18 below:

TABLE 18

| State | Switches Closed | Voltage at Second Pole 911 |
|---|---|---|
| First | S1b", S2b", S3b", S4b" | DC input voltage |
| Second | S2b", S3b", S4b", S5b" | ¾ DC input voltage |
| Third | S3b", S4b", S5b", S6b" | ½ DC input voltage |
| Fourth | S4b", S5b", S6b", S7b" | ¼ DC input voltage |
| Fifth | S5b", S6b", S7b", S8b" | Zero (negative DC rail) |

Accordingly, the inverter 800 may be configurable to nine different levels, indicated by TABLE 19:

TABLE 19

| Output Level | First Pole Switch Bank State(s) | Second Pole Switch Bank State(s) |
|---|---|---|
| DC input voltage | (1) First (First Pole 908 = DC input voltage) | (1) Fifth (Second Pole 911 = Zero) |
| ¾ DC input voltage | (1) First (First Pole 908 = DC input voltage) | (1) Fourth (Second Pole 911 = ¼ DC input voltage) |
|  | (2) Second (First Pole 908 = ¾ DC input voltage) | (2) Fifth (Second Pole 911 = Zero) |
| ½ DC input voltage | (1) First (First Pole 908 = DC input voltage) | (1) Third (Second Pole 911 = ½ DC input voltage) |
|  | (2) Second (First Pole 908 = ¾ DC input voltage) | (2) Fourth (Second Pole 911 = ¼ DC input voltage) |
|  | (3) Third (First Pole 908 = ½ DC input voltage) | (3) Fifth (Second Pole 911 = Zero) |
| ¼ DC input voltage | (1) First (First Pole 908 = DC input voltage) | (1) Second (Second Pole 911 = ¾ DC input voltage) |
|  | (2) Second (First Pole 908 = ¾ DC input voltage) | (2) Third (Second Pole 911 = ½ DC input voltage) |
|  | (3) Third (First Pole 908 = ½ DC input voltage) | (3) Fourth (Second Pole 911 = ¼ DC input voltage) |
|  | (4) Fourth (First Pole 908 = ¼ DC input voltage) | (4) Fifth (Second Pole 911 = Zero) |
| 0 (negative rail of DC input voltage) | (1) First (First Pole 908 = DC input voltage) | (1) First (Second Pole 911 = DC input voltage) |
|  | (2) Second (First Pole 908 = ¾ DC input voltage) | (2) Second (Second Pole 911 = ¾ DC input voltage) |
|  | (3) Third (First Pole 908 = ½) | (3) Third (Second Pole 911 = ½) |
|  | (4) Fourth (First Pole 908 = ¼ DC input voltage) | (4) Fourth (Second Pole 911 = ¼ DC input voltage) |
|  | (5) Fifth (First Pole 908 = Zero) | (5) Fifth (Second Pole 911 = Zero) |
| −¼ DC input voltage | (1) Second (First Pole 908 = ¾ DC input voltage) | (1) First (Second Pole 911 = DC input voltage) |
|  | (2) Third (First Pole 908 = ½ DC input voltage) | (2) Second (Second Pole 911 = ¾ DC input voltage) |
|  | (3) Fourth (First Pole 908 = ¼ DC input voltage) | (3) Third (Second Pole 911 = ½) |
|  | (4) Fifth (First Pole 908 = Zero) | (4) Fourth (Second Pole 911 = ¼ DC input voltage) |
| −½ DC input voltage | (1) Third (First Pole 908 = ½) | (1) First (Second Pole 911 = DC input voltage) |
|  | (2) Fourth (First Pole 908 = ¼ DC input voltage) | (2) Second (Second Pole 911 = ¾ DC input voltage) |
|  | (3) Third (First Pole 908 = Zero) | (3) Third (Second Pole 911 = ½) |
| −¾ DC input voltage | (1) Fourth (First Pole 908 = ¼ DC input voltage) | (1) First (Second Pole 911 = DC input voltage) |
|  | (2) Fifth (First Pole 908 = Zero) | (2) Second (Second Pole 911 = ¾ DC input voltage) |
| −DC input voltage | (1) Fifth (First Pole 908 = Zero) | (1) First (Second Pole 911 = DC input voltage) |

Any suitable switching sequence may be utilized for the inverter 900. For example, during a first period, the control circuit may modulate the switch banks 916, 918 to toggle the output of the inverter 900 between zero and ¼ of the DC input voltage. An example switching sequence for doing so is provided by TABLE 20 below:

TABLE 20

| | First Bank 916 State (Switches Closed) | Second Bank 918 State (Switches Closed) | Output Voltage (First Pole 908-Second Pole 911) |
|---|---|---|---|
| 1 | First (S1a", S2a", S3a", S4a") | First (S1b", S2b", S3b", S4b") | 0 Volts (DC input voltage-DC input voltage) |
| 2 | First (S1a", S2a", S3a", S4a") | Second (S2b", S3b", S4b", S5b") | ¼ DC input voltage (DC input voltage-¾ DC input voltage) |
| 3 | Second (S2a", S3a", S4a", S5a") | Second (S2b", S3b", S4b", S5b") | 0 Volts (¾ DC input voltage-¾ DC input voltage) |
| 4 | Second (S2a", S3a", S4a", S5a") | Third (S3b", S4b", S5b", S6b") | ¼ DC input voltage (¾ DC input voltage-½ DC input voltage) |
| 5 | Third (S3a", S4a", S5a", S6a") | Third (S3b", S4b", S5b", S6b") | 0 Volts (½ DC input voltage-½ DC input voltage) |
| 6 | Third (S3a", S4a", S5a", S6a") | Fourth (S4b", S5b", S6b", S7b") | ¼ DC input voltage (½ DC input voltage-¼ DC input voltage) |
| 7 | Fourth (S4a", S5a", S6a", S7a") | Fourth (S4b", S5b", S6b", S7b") | 0 Volts (¼ DC input voltage-¼ DC input voltage) |
| 8 | Fourth (S4a", S5a", S6a", S7a") | Fifth (S5b", S6b", S7b", S8b") | ¼ DC input voltage (¼ DC input voltage-Zero) |
| 9 | Fifth (S5a", S6a", S7a", S8a") | Fifth (S5b", S6b", S7b", S8b") | 0 Volts (Zero-Zero) |

As described herein with respect to the switching of the inverter 10, the control circuit may configure the inverter 900 to traverse the sequence of states shown in TABLE 20 sequentially back-and-forth.

During a second period, the control circuit may modulate the switch banks 916, 918 to toggle the output voltage of the inverter 900 between ¼ of the DC input voltage and ½ of the DC input voltage. An example switching sequence for doing so is provided by TABLE 21 below:

TABLE 21

| | First Bank 916 State (Switches Closed) | Second Bank 918 State (Switches Closed) | Output Voltage (First Pole 908-Second Pole 911) |
|---|---|---|---|
| 1 | First (S1a", S2a", S3a", S4a") | Second (S2b", S3b", S4b", S5b") | ¼ DC input voltage (DC input voltage-¾ DC input voltage) |
| 2 | First (S1a", S2a", S3a", S4a") | Third (S3b", S4b", S5b", S6b") | ½ DC input voltage (DC input voltage-½ DC input voltage) |
| 3 | Second (S2a", S3a", S4a", S5a") | Third (S3b", S4b", S5b", S6b") | ¼ DC input voltage (¾ DC input voltage-½ DC input voltage) |
| 4 | Second (S2a", S3a", S4a", S5a") | Fourth (S4b", S5b", S6b", S7b") | ½ DC input voltage (¾ DC input voltage-¼ DC input voltage) |
| 5 | Third (S3a", S4a", S5a", S6a") | Fourth (S4b", S5b", S6b", S7b") | ¼ DC input voltage (½ DC input voltage-¼ DC input voltage) |
| 6 | Third (S3a", S4a", S5a", S6a") | Fifth (S5b", S6b", S7b", S8b") | ½ DC input voltage (½ DC input voltage-Zero) |
| 7 | Fourth (S4a", S5a", S6a", S7a") | Fifth (S5b", S6b", S7b", S8b") | ¼ DC input voltage (¼ DC input voltage-Zero) |

As described herein with respect to the switching of the inverter 10, the control circuit may configure the inverter 900 to traverse the sequence of states shown in TABLE 21 sequentially back-and-forth.

During a third period, the control circuit may modulate the switch banks 916, 918 to toggle the output voltage of the inverter 900 between ½ of the DC input voltage and ¾ of the DC input voltage. An example switching sequence for doing so is provided by TABLE 22:

TABLE 22

| | First Bank 916 State (Switches Closed) | Second Bank 918 State (Switches Closed) | Output Voltage (First Pole 908-Second Pole 911) |
|---|---|---|---|
| 1 | First (S1a", S2a", S3a", S4a") | Third (S3b", S4b", S5b", S6b") | ½ DC input voltage (DC input voltage-½ DC input voltage) |
| 2 | First (S1a", S2a", S3a", S4a") | Fourth (S4b", S5b", S6b", S7b") | ¾ DC input voltage (DC input voltage-¼ DC input voltage) |
| 3 | Second (S2a", S3a", S4a", S5a") | Fourth (S4b", S5b", S6b", S7b") | ½ DC input voltage (¾ DC input voltage-¼ DC input voltage) |
| 4 | Second (S2a", S3a", S4a", S5a") | Fifth (S5b", S6b", S7b", S8b") | ¾ DC input voltage (¾ DC input voltage-Zero) |
| 5 | Third (S3a", S4a", S5a", S6a") | Fifth (S5b", S6b", S7b", S8b") | ½ DC input voltage (½ DC input voltage-Zero) |

As described herein with respect to the switching of the inverter 10, the control circuit may configure the inverter 900 to traverse the sequence of states shown in TABLE 22 sequentially back-and-forth.

During a fourth period, the control circuit may modulate the switch banks 916, 918 to toggle the output voltage of the inverter 900 between ¾ of the DC input voltage and the DC input voltage. An example switching sequence for doing so is provided by TABLE 23 below:

TABLE 23

| | First Bank 916 State (Switches Closed) | Second Bank 918 State (Switches Closed) | Output Voltage (First Pole 908-Second Pole 911) |
|---|---|---|---|
| 1 | First (S1a", S2a", S3a", S4a") | Fourth (S4b", S5b", S6b", S7b") | ¾ DC input voltage (DC input voltage-¼ DC input voltage) |
| 2 | First (S1a", S2a", S3a", S4a") | Fifth (S5b", S6b", S7b", S8b") | DC input voltage (DC input voltage-Zero) |
| 3 | Second (S2a", S3a", S4a", S5a") | Fifth (S5b", S6b", S7b", S8b") | ¾ DC input voltage (¾ DC input voltage-Zero) |

As described herein with respect to the switching of the inverter 10, the control circuit may configure the inverter 900 to traverse the sequence of states shown in TABLE 23 sequentially back-and-forth.

During a fifth period, the control circuit may modulate the switch banks 916, 918 to toggle the output voltage of the inverter 900 between ¾ of the DC input voltage and ½ of the DC input voltage, for example, according to the switching sequence of TABLE 22. During a sixth period, the control circuit may modulate the switch banks 916, 918 to toggle the output voltage of the inverter 900 between ½ of the DC input voltage and ¼ of the DC input voltage, for example, according to the switching sequence of TABLE 21. During a seventh period, the control circuit may modulate the switch banks 916, 918 to toggle the output voltage of the inverter 900 between ½ of the DC input voltage and zero, for example, according to the switching sequence of TABLE 20. During an eighth period, the control circuit may modulate the switch banks 916, 918 to toggle the output voltage of the inverter 900 between zero and −¼ of the DC input voltage. An example switching sequence for doing so is provided by TABLE 24 below:

TABLE 24

| | First Bank 916 State (Switches Closed) | Second Bank 918 State (Switches Closed) | Output Voltage (First Pole 908-Second Pole 911) |
|---|---|---|---|
| 1 | First (S1a", S2a", S3a", S4a") | First (S1b", S2b", S3b", S4b") | 0 Volts (DC input voltage-DC input voltage) |
| 2 | Second (S2a", S3a", S4a", S5a") | First (S1b", S2b", S3b", S4b") | −¼ DC input voltage (¾ DC input voltage-DC input voltage) |

TABLE 24-continued

| | First Bank 916 State (Switches Closed) | Second Bank 918 State (Switches Closed) | Output Voltage (First Pole 908-Second Pole 911) |
|---|---|---|---|
| 3 | Second (S2a", S3a", S4a", S5a") | Second (S2b", S3b", S4b", S5b") | 0 Volts (¾ DC input voltage-¾ DC input voltage) |
| 4 | Third (S3a", S4a", S5a", S6a") | Second (S2b", S3b", S4b", S5b") | −¼ DC input voltage (½ DC input voltage-¾ DC input voltage) |
| 5 | Third (S3a", S4a", S5a", S6a") | Third (S3b", S4b", S5b", S6b") | 0 Volts (½ DC input voltage-½ DC input voltage) |
| 6 | Fourth (S4a", S5a", S6a", S7a") | Third (S3b", S4b", S5b", S6b") | −¼ DC input voltage (¼ DC input voltage-½ DC input voltage) |
| 7 | Fourth (S4a", S5a", S6a", S7a") | Fourth (S4b", S5b", S6b", S7b") | 0 Volts (¼ DC input voltage-¼ DC input voltage) |
| 8 | Fifth (S5a", S6a", S7a", S8a") | Fourth (S4b", S5b", S6b", S7b") | −¼ DC input voltage (Zero-¼ DC input voltage) |
| 9 | Fifth (S5a", S6a", S7a", S8a") | Fifth (S5b", S6b", S7b", S8b") | 0 Volts (Zero-Zero) |

As described herein with respect to the switching of the inverter 10, the control circuit may configure the inverter 900 to traverse the sequence of states shown in TABLE 24 sequentially back-and-forth.

During a ninth period, the control circuit may modulate the switch banks 916, 918 to toggle the output voltage of the inverter 900 between −¼ of the DC input voltage and −½ of the DC input voltage. An example switching sequence for doing so is provided by TABLE 25 below:

TABLE 25

| | First Bank 916 State (Switches Closed) | Second Bank 918 State (Switches Closed) | Output Voltage (First Pole 908-Second Pole 911) |
|---|---|---|---|
| 1 | Second (S2a", S3a", S4a", S5a") | First (S1b", S2b", S3b", S4b") | −¼ DC input voltage (¾ DC input voltage-DC input voltage) |
| 2 | Third (S3a", S4a", S5a", S6a") | First (S1b", S2b", S3b", S4b") | −½ DC input voltage (½ input voltage-DC input voltage) |
| 3 | Third (S3a", S4a", S5a", S6a") | Second (S2b", S3b", S4b", S5b") | −¼ DC input voltage (½ DC input voltage-¾ DC input voltage) |
| 4 | Fourth (S4a", S5a", S6a", S7a") | Second (S2b", S3b", S4b", S5b") | −½ Volts (¼ DC input voltage-¾ DC input voltage) |
| 5 | Fourth (S4a", S5a", S6a", S7a") | Third (S3b", S4b", S5b", S6b") | −¼ DC input voltage (¼ DC input voltage-½ DC input voltage) |
| 6 | Fifth (S5a", S6a", S7a", S8a") | Third (S3b", S4b", S5b", S6b") | −½ Volts (Zero-½ DC input voltage) |
| 7 | Fifth (S5a", S6a", S7a", S8a") | Fourth (S4b", S5b", S6b", S7b") | −¼ DC input voltage (Zero-¼ DC input voltage) |

The control circuit may configure the inverter 900 to traverse the sequences of states shown in TABLE 25 sequentially back-and-forth, as described herein.

During a tenth period, the control circuit may modulate the switch banks 916, 918 to toggle the output voltage of the inverter 900 between −½ and −¾ of the DC input voltage. An example switching sequence for doing so is provided by TABLE 26 below:

TABLE 26

| | First Bank 916 State (Switches Closed) | Second Bank 918 State (Switches Closed) | Output Voltage (First Pole 908-Second Pole 911) |
|---|---|---|---|
| 1 | Third (S3a", S4a", S5a", S6a") | First (S1b", S2b", S3b", S4b") | −½ DC input voltage (½ input voltage-DC input voltage) |
| 2 | Fourth (S4a", S5a", S6a", S7a") | First (S1b", S2b", S3b", S4b") | −¾ DC input voltage (¼ DC input voltage-DC input voltage) |
| 3 | Fourth (S4a", S5a", S6a", S7a") | Second (S2b", S3b", S4b", S5b") | −½ Volts (¼ DC input voltage-¾ DC input voltage) |
| 4 | Fifth (S5a", S6a", S7a", S8a") | Second (S2b", S3b", S4b", S5b") | −¾ DC input voltage (Zero-¾ DC input voltage) |
| 5 | Fifth (S5a", S6a", S7a", S8a") | Third (S3b", S4b", S5b", S6b") | −½ Volts (Zero-½ DC input voltage) |

The control circuit may configure the inverter 900 to traverse the sequences of states shown in TABLE 26 sequentially back-and-forth, as described herein.

During an eleventh period, the control circuit may modulate the switch banks 916, 918 to toggle the output voltage of the inverter 900 between −¾ of the DC input voltage and −1 of the DC input voltage. An example switching sequence for doing so is provided by TABLE 27 below:

TABLE 27

| | First Bank 916 State (Switches Closed) | Second Bank 918 State (Switches Closed) | Output Voltage (First Pole 908-Second Pole 911) |
|---|---|---|---|
| 1 | Fourth (S4a", S5a", S6a", S7a") | First (S1b", S2b", S3b", S4b") | −¾ DC input voltage (¼ DC input voltage-DC input voltage) |
| 2 | Fifth (S5a", S6a", S7a", S8a") | First (S1b", S2b", S3b", S4b") | − DC input voltage Volts (Zero-DC input voltage) |
| 3 | Fifth (S5a", S6a", S7a", S8a") | Second (S2b", S3b", S4b", S5b") | −¾ DC input voltage (Zero-¾ DC input voltage) |

The control circuit may configure the inverter 900 to traverse the sequences of states shown in TABLE 27 sequentially back-and-forth, as described herein. During a twelfth period, the control circuit may modulate the switch banks 916, 918 to toggle the output voltage of the inverter 900 between −¾ and −½ of the DC input voltage, for example, according to the switching sequence of TABLE 26. During a thirteenth period, the control circuit may modulate the switch banks 916, 918 to toggle the output voltage of the inverter 900 between −½ and −¼ of the DC input voltage, for example, according to the switching sequence of TABLE 25. During a fourteenth period, the control circuit may modulate the switch banks 916, 918 to toggle the output voltage of the inverter 900 between ¼ of the DC input voltage and zero. In some examples, the control circuit may implement the fourteen periods described with respect to the inverter 900 to implement one cycle of an output waveform. The shape of the waveform may be modified, for example, by varying the length of the various periods. This waveform sequence, however, is just one way that the inverter 900 may be used. Any suitable switching sequence may be used to achieve any suitable type of waveform, for example, while enjoying some or all of the benefits described herein. In various examples, other similar inverters may be generated comprising switching banks, poles and capacitors, as described herein. For example, inverters utilizing more than four capacitors could also be used.

Figure 13:
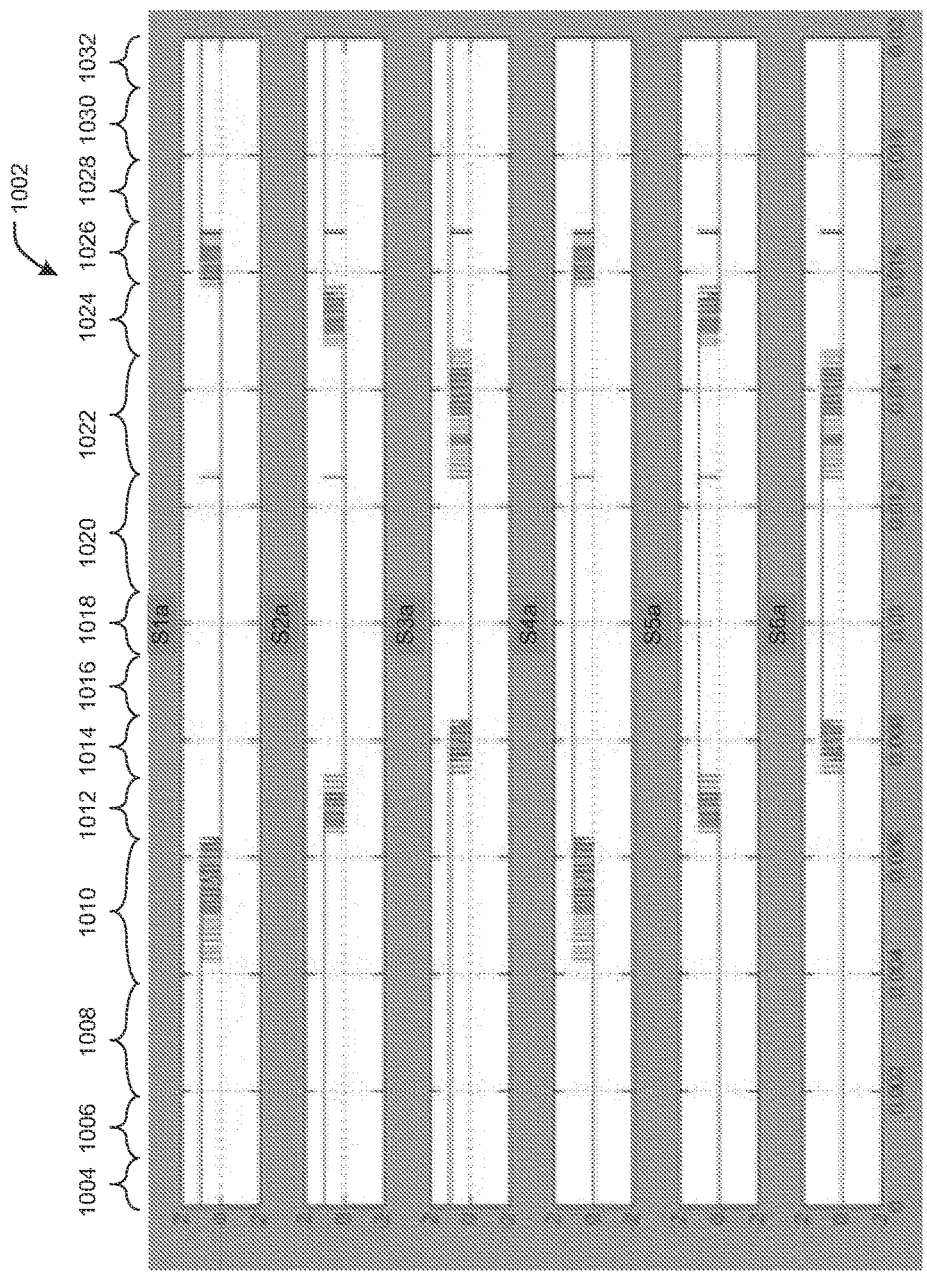
FIGS. 13-14 show an alternate switching sequence that may be used in conjunction with the inverter of FIG. 1 to generate an output waveform.
Figure 14:
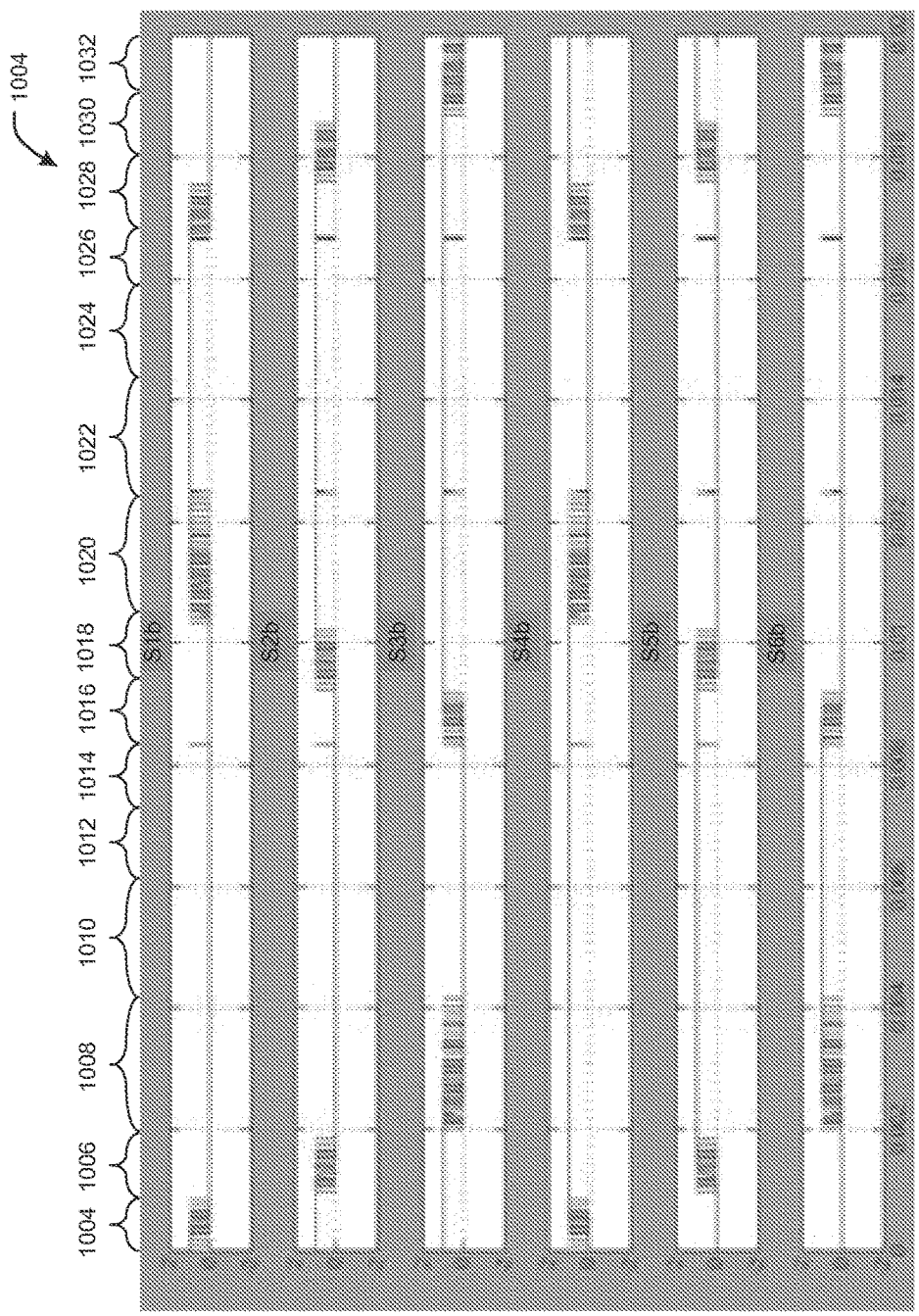
Figure 15:
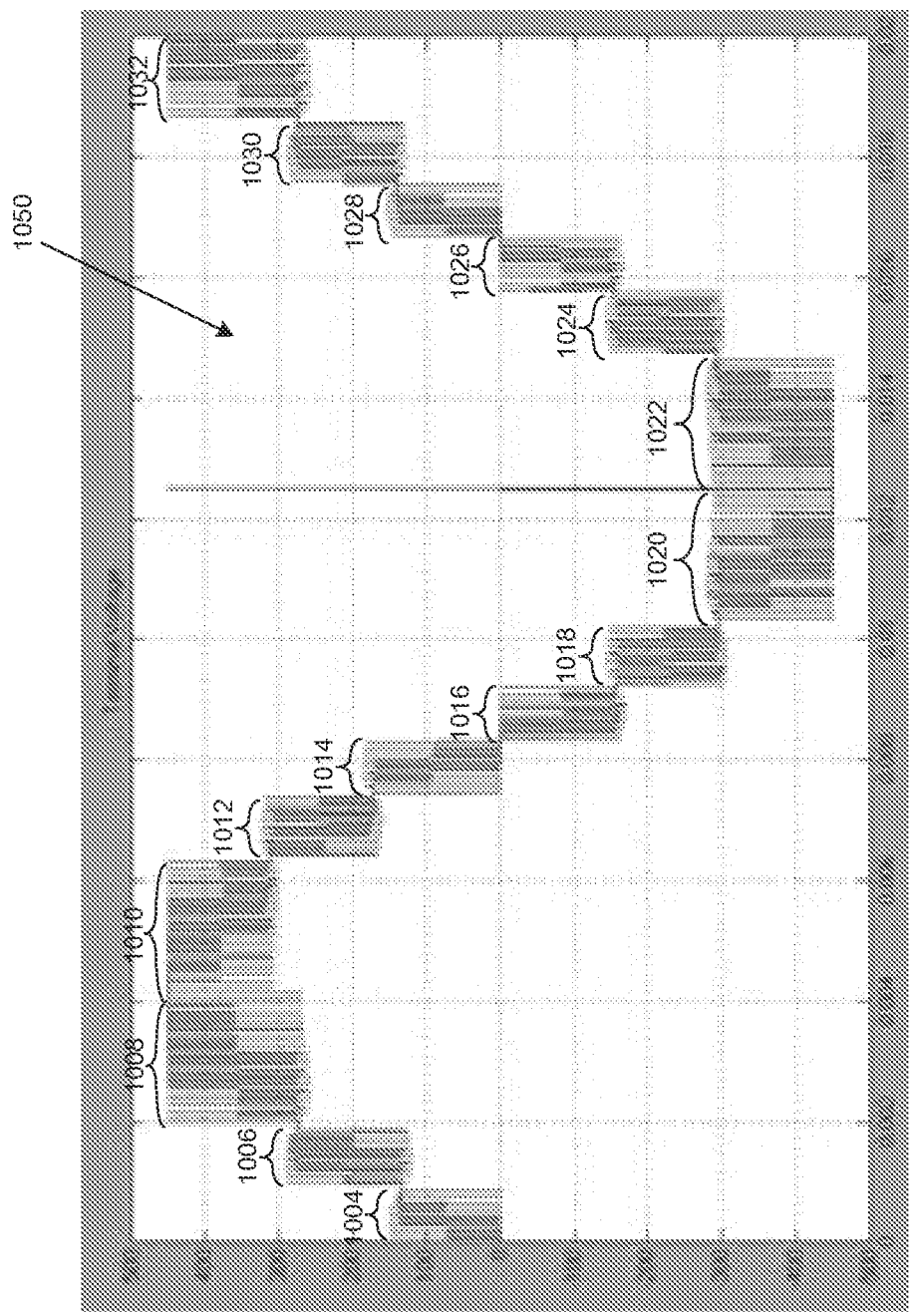
FIG. 15 is a diagram showing an output waveform generated in accordance with the switching sequence of FIGS. 13-14.

In the switching sequence examples described with respect to TABLES 4-6 for the inverter 10, TABLES 13-16 for the inverter 800 and TABLES 20-27 for the inverter 900, the first and second switching banks are both switched during each period. For example, referring to TABLE 4, during the first period, the control circuit 114 toggles both the first switch bank 16 and the second switch bank 18. In some examples, however, the control circuit 114 may be programmed to generate an output waveform by holding one switch bank constant while toggling the other switch bank. For example, FIGS. 13-14 show an alternate switching sequence that may be used in conjunction with the inverter 100 to generate an output waveform 1050. FIG. 13 shows a diagram 1002 indicating the states of switches S1a, S2a, S3a, S4a, S5a, S6a of the first switch bank 16. FIG. 14 shows a diagram 1004 indicating the states of the switches S1b, S2b, S3b, S4b, S5b, S6b of the second switch bank 18. In the diagrams 1002, 1004, a "1" for a switch indicates that the switch is closed, while a "0" for a switch indicates that the switch is open. FIG. 15 is a diagram showing an output waveform generated in accordance with the switching sequence of FIGS. 12-13. Although the switching sequence of FIGS. 13-15 is described with respect to the inverter 10, similar switching sequences may be used with the other inverters 800, 900 described herein.

In the example of FIGS. 13-15, the DC input voltage is 450 Volts. During a first period 1004 between zero and about 1 millisecond (ms), the output of the inverter 100 (e.g., the waveform 1050) toggles between zero and 150 Volts, or ⅓ of the DC input voltage. During the first period 1004, as shown in FIG. 13, the control circuit 114 may maintain the first switch bank 16 is in its first state, with switches S1a, S2*a*, and S3*a* closed. Accordingly, the first pole 8 is at the DC input voltage (e.g., 450 Volts). Also during the first period 1004, as shown in FIG. 13, the control circuit 114 may toggle the second switch bank between the first state, with switches S1*b*, S2*b*, and S3*b* closed and the second state, with switches S2*b*, S3*b*, and S4*b* closed. This causes the voltage at the second pole 11 to toggle between the DC input voltage (e.g., 450 V) and ⅔ of the DC input voltage (e.g., 300 V). The difference between the poles 8, 11, then toggles between zero and 150 V, as indicated in the waveform 1050.

During a second period 1006 between about 1 ms and 2 ms, the control circuit 114 maintains the first switch bank 16 in the first state, maintaining the first pole 8 at the DC input voltage (e.g., 450 V). The control circuit 114 toggles the second switch bank 18 between the second stage (S2*b*, S3*b*, S4*b* closed) and the third state (S3*b*, S4*b*, S5*b* closed). This may toggle the voltage at the pole 11 between ⅓ of the DC input voltage (e.g., 150 V) and ⅔ of the DC input voltage (300 V). Accordingly, the output waveform 1050 may toggle between about ⅓ of the DC input voltage (e.g., 150 V) and ⅔ of the DC input voltage (e.g. 300V).

During a third period 1008 between about 2 ms and 4 ms, the control circuit 114 may continue to maintain the first switch bank 16 in the first state, maintaining the first pole 8 at the DC input voltage (e.g., 450 V). The control circuit 114 toggles the second switch bank 18 between the third stage (S3*b*, S4*b*, S5*b* closed) and the fourth state (S4*b*, S5*b*, S6*b* closed). This may toggle the voltage at the pole 11 between ⅓ of the DC input voltage (e.g. 150 V) and zero. With the first pole 8 held at 450 V, this may cause the output waveform 1050 to toggle between about ⅔ of the DC input voltage (e.g., 300 V) and the DC input voltage (e.g., 450 V).

During a fourth period 1010 between about 4 ms and 6 ms, the control circuit 114 may maintain the second switch bank 18 in the fourth state (S4*b*, S5*b*, S6*b* closed), causing the second pole 11 to stay at zero. The control circuit 114 may also toggle the first switch bank 16 between the first state (S1*a*, S2*a*, S3*a* closed) and the second state (S2*a*, S3*a*, S4*a* closed), causing the voltage at the first pole 8 to toggle between the DC input voltage (e.g., 450 V) and ⅔ of the DC input voltage (e.g., 300 V). As the second pole 11 is held at zero, this may reflect the state of the output waveform 1050 during the fourth period 1010.

During a fifth period 1012 between about 6 ms and 7.5 ms, the control circuit 114 may maintain the second switch bank 16 in the fourth state (S4*b*, S5*b*, S6*b* closed), similar to the fourth period 1010. The control circuit 114 may toggle the first switch bank 16 between the second state (S2*a*, S3*a*, S4*a* closed) and the third state (S3*a*, S4*a*, S5*a* closed). This may toggle the first pole 8 between ⅔ of the DC input voltage (e.g., 300 V) and ⅓ of the DC input voltage (e.g., 150 V). Again, because the second pole 11 is held at zero, the output waveform 1050 may also toggle between ⅔ of the DC input voltage (e.g., 300 V) and ⅓ of the DC input voltage (e.g., 150 V).

During a sixth period 1014 between about 7.5 ms and 8.5 ms, the control circuit 114 may continue to maintain the second switch bank 16 in the fourth state (S4*b*, S5*b*, S6*b* closed), drawing the pole 11 to zero. The control circuit 114 may toggle the first switch bank 16 between the third state (S3*a*, S4*a*, S5*a* closed) and the fourth state (S4*a*, S5*a*, S6*a* closed), thus toggling the first pole 8 and the output waveform 1050 between ½ of the DC input voltage (e.g. 150 V) and zero.

During a seventh period 1016 between about 8.5 ms and 9.5 ms, the control circuit 114 may maintain the first switch bank 16 in the fourth state (S4*a*, S5*a*, S6*a* closed), drawing the pole 8 to zero. The control circuit 114 may toggle the second switch bank 18 between the third state (S3*b*, S4*b*, S5*b* closed) and the fourth state (S4*b*, S5*b*, S6*b* closed), toggling the second pole 11 between ⅓ of the DC input voltage (e.g., 150 V) and zero. Because the first pole 8 is at zero, this may toggle the output waveform 1050 between zero and −⅓ of the DC input voltage (e.g., −150 V).

During an eighth period 1018 between about 9.5 ms and 10.5 ms, the control circuit 114 may maintain the first switch bank 16 in the fourth state (S4*a*, S5*a*, S6*a* closed), drawing the pole 8 to zero. The control circuit 114 may toggle the second switch bank 18 between the second state (S2*b*, S3*b*, S4*b* closed) and the third state (S3*b*, S4*b*, S5*b* closed), toggling the second pole 11 between ⅔ of the DC input voltage (e.g., 300 V) and ⅓ of the DC input voltage (e.g., 150 V). Because the first pole 8 is at zero, this may toggle the output waveform between −⅓ of the DC input voltage (e.g., −150 V) and −⅔ of the DC input voltage (e.g., −300 V).

During a ninth period 1020 between about 10.5 ms and 12.5 ms, the control circuit 114 may maintain the first switch bank 16 in the fourth state (S4*a*, S5*a*, S6*a* closed), drawing the pole 8 to zero. The control circuit 114 may toggle the second switch bank 18 between the first state (S1*b*, S2*b*, S3*b* closed) and the second state (S2*b*, S3*b*, S4*b* closed), toggling the second pole 11 between ⅔ of the DC input voltage (e.g., 300 V) and −1 of the DC input voltage (e.g., −450 V). Because the first pole 8 is zero, this may toggle the output waveform between −⅔ of the DC input voltage (e.g., −300 V) and −1 of the DC input voltage (e.g., −450 V).

During a tenth period 1022 between about 12.5 ms and 14.5 ms, the control circuit 114 may maintain the second switch bank in the first state (S1*b*, S2*b*, S3*b* closed), drawing the pole 11 to the DC input voltage (e.g., 450 V). The control circuit 114 may toggle the first switch bank 16 between the third state (S3*a*, S4*a*, S5*a* closed) and the fourth state (S4*a*, S5*a*, S6*a* closed), toggling the first pole 8 between ⅓ of the DC input voltage (e.g., 150 V) and zero. Because the second pole 11 is held at the DC input voltage (e.g., 450 V), this may cause the output waveform 1050 to toggle between −⅔ of the DC input voltage (−300 V) and −1 of the DC input voltage (−450 V).

During an eleventh period 1024 between about 14.5 ms and 15.5 ms, the control circuit 114 may maintain the second switch bank in the first state (S1*b*, S2*b*, S3*b* closed), drawing the pole 11 to the DC input voltage (e.g., 450 V). The control circuit 114 may toggle the first switch bank 16 between the second state (S2*a*, S3*a*, S4*a* closed) and the third state (S3*a*, S4*a*, S5*a* closed), toggling the first pole 8 between ⅔ of the DC input voltage (e.g., 300 V) and ⅓ of the DC input voltage (e.g., 150 V). Because the second pole 11 is held at the DC input voltage (e.g., 450 V), this may cause the output waveform 1050 to toggle between −⅓ of the DC input voltage (e.g., −150 V) and −⅔ of the DC input voltage (−300 V).

During a twelfth period 1026 between about 15.5 ms and 16.5 ms, the control circuit 114 may maintain the second switch bank in the first state (S1*b*, S2*b*, S3*b* closed), drawing the pole 11 to the DC input voltage (e.g., 450 V). The control circuit 114 may toggle the first switch bank 16 between the first state (S1*a*, S2*a*, S3*a* closed) and the second state (S2*a*, S3*a*, S4*a* closed), toggling the first pole 8 between ⅔ of the DC input voltage (e.g., 300 V) and the DC input voltage (e.g., 450 V). Because the second pole 11 is held at the DC input voltage (e.g., 450V), this may cause the output waveform 1050 to toggle between −⅓ of the DC input voltage (e.g., −150 V) and zero. The twelve time periods 1004, 1006, 1008, 1010, 1012, 1014, 1016, 1018, 1020, 1022, 1024, 1026 may complete one cycle of the output waveform 1050. The lengths of the respective periods may vary, for example, to vary the shape of the waveform 1050. Additional periods 1028, 1030, 1032 may correspond to a next cycle of the waveform 1050. For example, during period 1028, the switch banks 16, 18 may be configured as described with respect to the period 1004. Similarly, period 1030 may correspond to period 1006 and period 1032 may correspond to period 1008.

Although various systems described herein may be embodied in software or code executed by one or more microprocessors as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A system for converting direct current (DC) to alternating current (AC), the system comprising:
    a DC bus comprising a positive DC rail and a negative DC rail to receive a DC input voltage;
    a first capacitor electrically coupled to the positive DC rail;
    a second capacitor;
    a third capacitor electrically coupled to the negative DC rail, wherein the first capacitor, the second capacitor and the third capacitor are electrically coupled in series between the positive DC rail and the negative DC rail,
    a first pole switch bank comprising a plurality of first pole switches;
    a first pole electrically coupled to the first pole switch bank;
    a second pole switch bank comprising a plurality of second pole switches;
    a second pole electrically coupled to the second pole switch bank; and
    a control circuit comprising at least one processor programmed to alternately switch the first pole switch bank and the second pole switch bank to:
        a first state of the first pole switch bank in which the first pole is electrically coupled to the positive DC rail;
        a second state of the first pole switch bank in which the first pole is electrically coupled between the first capacitor and the second capacitor;
        a third state of the first pole switch bank in which the first pole is electrically coupled to the negative DC rail;
        a fourth state of the first pole switch bank in which the first pole is electrically coupled between the second capacitor and the third capacitor;
        a first state of the second pole switch bank in which the second pole is electrically coupled to the positive DC rail;
        a second state of the second pole switch bank in which the second pole is electrically coupled between the first capacitor and the second capacitor;
        a third state of the second pole switch bank in which the second pole is electrically coupled between the second capacitor and the third capacitor; and
        a fourth state of the second pole switch bank in which the second pole is electrically coupled to the negative DC rail, wherein during a first period, cycle the first pole switch bank and the second pole switch bank sequentially back-and-forth-between:
 (a) the first pole switch bank being in the first state of the first pole switch bank and the second pole switch bank being in the third state of the second pole switch bank;
 (b) the first pole switch bank being in the first state of the first pole switch bank and the second pole switch bank being in the fourth state of the second pole switch bank; and
 (c) the first pole switch bank being in the second state of the first pole switch bank and the second pole switch bank being in the fourth state of the second pole switch bank.

2. The system of claim 1, wherein the control circuit is further programmed to cycle the first pole switch bank and the second pole switch bank sequentially back-and-forth at a switching frequency of about 10 kHz.

3. The system of claim 1, wherein the control circuit is further programmed to:
 during a second period after the first period, cycle the first pole switch bank and the second pole switch bank sequentially back-and-forth between:
 (a) the first pole switch bank being in the first state of the first pole switch bank and the second pole switch bank being in the second state of the second pole switch bank;
 (b) the first pole switch bank being in the first state of the first pole switch bank and the second pole switch bank being in the third state of the second pole switch bank;
 (c) the first pole switch bank being in the second state of the first pole switch bank and the second pole switch bank being in the third state of the second pole switch bank;
 (d) the first pole switch bank being in the second state of the first pole switch bank and the second pole switch bank being in the fourth state of the second pole switch bank; and
 (e) the first pole switch bank being in the third state of the first pole switch bank and the second pole switch bank being in the fourth state of the second pole switch bank.

4. The system of claim 3, wherein the control circuit is further programmed to:
 during a third period after the second period, cycle the first pole switch bank and the second pole switch bank sequentially back-and-forth between:
 (a) the first pole switch bank being in the first state of the first pole switch bank and the second pole switch bank being in the first state of the second pole switch bank;
 (b) the first pole switch bank being in the first state of the first pole switch bank and the second pole switch bank being in the second state of the second pole switch bank;
 (c) the first pole switch bank being in the second state of the first pole switch bank and the second pole switch bank being in the second state of the second pole switch bank;
 (d) the first pole switch bank being in the second state of the first pole switch bank and the second pole switch bank being in the third state of the second pole switch bank;
 (e) the first pole switch bank being in the third state of the first pole switch bank and the second pole switch bank being in the third state of the second pole switch bank;
 (f) the first pole switch bank being in the third state of the first pole switch bank and the second pole switch bank being in the fourth state of the second pole switch bank; and
 (g) the first pole switch bank being in the fourth state of the first pole switch bank and the second pole switch bank being in the fourth state of the second pole switch bank.

5. The system of claim 4, wherein the control circuit is further programmed to:
 during a fourth period after the third period, cycle the first pole switch bank and the second pole switch bank sequentially back-and-forth between:
 (a) the first pole switch bank being in the first state of the first pole switch bank and the second pole switch bank being in the first state of the second pole switch bank;
 (b) the first pole switch bank being in the second state of the first pole switch bank and the second pole switch bank being in the second state of the first pole switch bank;
 (c) the first pole switch bank being in the second state of the first pole switch bank and the second pole switch bank being in the second state of the second pole switch bank;
 (d) the first pole switch bank being in the third state of the first pole switch bank and the second pole switch bank being in the second state of the second pole switch bank;
 (e) the first pole switch bank being in the third state of the first pole switch bank and the second pole switch bank being in the third state of the second pole switch bank;
 (f) the first pole switch bank being in the fourth state of the first pole switch bank and the second pole switch bank being in the third state of the second pole switch bank; and
 (g) the first pole switch bank being in the fourth state of the first pole switch bank and the second pole switch bank being in the fourth state of the second pole switch bank.

6. The system of claim 5, wherein the control circuit is further programmed to:
 during a fifth period after the fourth period, cycle the first pole switch bank and the second pole switch bank sequentially back-and-forth between:
 (a) the first pole switch bank being in the second state of the first pole switch bank and the second pole switch bank being in the first state of the second pole switch bank;
 (b) the first pole switch bank being in the third state of the first pole switch bank and the second pole switch bank being in the first state of the second pole switch bank;
 (c) the first pole switch bank being in the third state of the first pole switch bank and the second pole switch bank being in the second state of the second pole switch bank;
 (d) the first pole switch bank being in the fourth state of the first pole switch bank and the second pole switch bank being in the second state of the second pole switch bank; and
 (e) the first pole switch bank being in the fourth state of the first pole switch bank and the second pole switch bank being in the third state of the second pole switch bank.

7. The system of claim 6, wherein the control circuit is further programmed to:

during a sixth period after the fifth period, cycle the first pole switch bank and the second pole switch bank sequentially back-and-forth between:
  (a) the first pole switch bank being in the third state of the first pole switch bank and the second pole switch bank being in the first state of the second pole switch bank;
  (b) the first pole switch bank being in the fourth state of the first pole switch bank and the second pole switch bank being in the first state of the second pole switch bank; and
  (c) the first pole switch bank being in the fourth state of the first pole switch bank and the second pole switch bank being in the second state of the second pole switch bank.

8. The system of claim 1, further comprising the third capacitor electrically coupled to the second capacitor and a fourth capacitor electrically coupled between the third capacitor and the negative DC rail, wherein the first capacitor, the second capacitor, the third capacitor and the fourth capacitor are electrically coupled in series between the positive DC rail and the negative DC rail, and wherein the at least one processor is further programmed to alternately switch the first pole switch bank to:
  a fifth state of the first pole switch bank in which the first pole is electrically coupled between the third capacitor and the fourth capacitor; and
  a fifth state of the second pole switch bank in which the second pole is electrically coupled between the third capacitor and the fourth capacitor.

* * * * *